(12) United States Patent
Sawada et al.

(10) Patent No.: US 9,678,272 B2
(45) Date of Patent: Jun. 13, 2017

(54) FLEXIBLE OPTICAL SUBSTRATE

(71) Applicant: Panasonic Intellectual Property Management Co., Ltd., Osaka (JP)

(72) Inventors: Susumu Sawada, Osaka (JP); Yoshihiro Tomita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/163,672

(22) Filed: May 25, 2016

(65) Prior Publication Data

US 2016/0356957 A1 Dec. 8, 2016

(30) Foreign Application Priority Data

Jun. 3, 2015 (JP) ................................ 2015-113370

(51) Int. Cl.
| G02B 6/00 | (2006.01) |
| G02B 6/122 | (2006.01) |
| G02B 6/125 | (2006.01) |
| F21V 8/00 | (2006.01) |

(52) U.S. Cl.
CPC .......... *G02B 6/1221* (2013.01); *G02B 6/0011* (2013.01); *G02B 6/125* (2013.01)

(58) Field of Classification Search
None
See application file for complete search history.

(56) References Cited

U.S. PATENT DOCUMENTS

| 3,844,752 | A | * | 10/1974 | Kaiser | ................... | C03B 23/207 |
| | | | | | | 385/100 |
| 3,976,357 | A | * | 8/1976 | Lohmeyer | ................ | G02B 6/00 |
| | | | | | | 385/125 |
| 5,711,588 | A | * | 1/1998 | Rudisill | ................ | F21S 48/215 |
| | | | | | | 200/313 |
| 7,543,971 | B2 | * | 6/2009 | Lee | ...................... | G02B 6/0018 |
| | | | | | | 362/23.19 |
| 7,825,899 | B2 | * | 11/2010 | Chen | ..................... | G06F 3/0202 |
| | | | | | | 340/407.2 |
| 2005/0208265 | A1 | * | 9/2005 | Desmarais | .............. | G09F 13/28 |
| | | | | | | 428/131 |
| 2009/0003754 | A1 | * | 1/2009 | Watanabe | ............. | B81B 3/0081 |
| | | | | | | 385/1 |

(Continued)

FOREIGN PATENT DOCUMENTS

| JP | 2004-071562 | | 3/2004 |
| JP | 2004-349002 | | 12/2004 |
| JP | 2008-102296 | A * | 5/2008 |

(Continued)

*Primary Examiner* — Mike Stahl
(74) *Attorney, Agent, or Firm* — Renner, Otto, Boisselle & Sklar, LLP

(57) ABSTRACT

A flexible optical substrate allows incident light or optical signals to be propagated or transmitted the flexible optical substrate. The flexible optical substrate includes unitary elastic structures. Each of the unitary elastic structures includes a film-like resin material that has a central portion and one or more strips provided outwardly of the central portion. One end of each of the one or more strips is connected to the central portion. Each of the unitary elastic structures has a clearance. Two adjacent unitary elastic structures are linked by at least part of the strips of the two adjacent unitary elastic structures.

16 Claims, 19 Drawing Sheets

(56) References Cited

U.S. PATENT DOCUMENTS

2011/0148661 A1* 6/2011 Shikii .............. G08G 1/096716
340/907
2014/0124257 A1 5/2014 Yoshihara et al.

FOREIGN PATENT DOCUMENTS

| JP | 2009-224508 | 10/2009 |
| JP | 2009-259929 | 11/2009 |
| JP | 2011-070777 | 4/2011 |
| JP | 2012-231018 | 11/2012 |
| JP | 2013-015736 | 1/2013 |
| JP | 2013-016406 | 1/2013 |
| JP | 2013-145842 | 7/2013 |
| JP | 2014-162124 | 9/2014 |

* cited by examiner

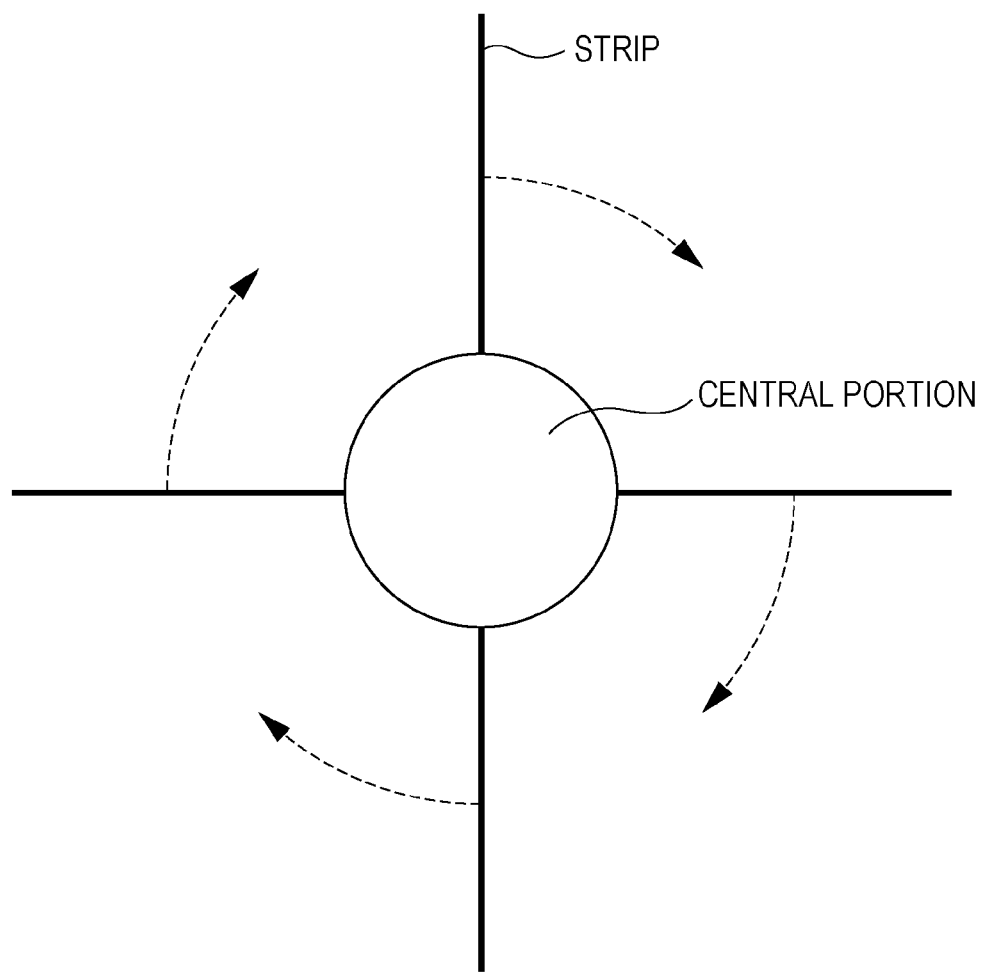

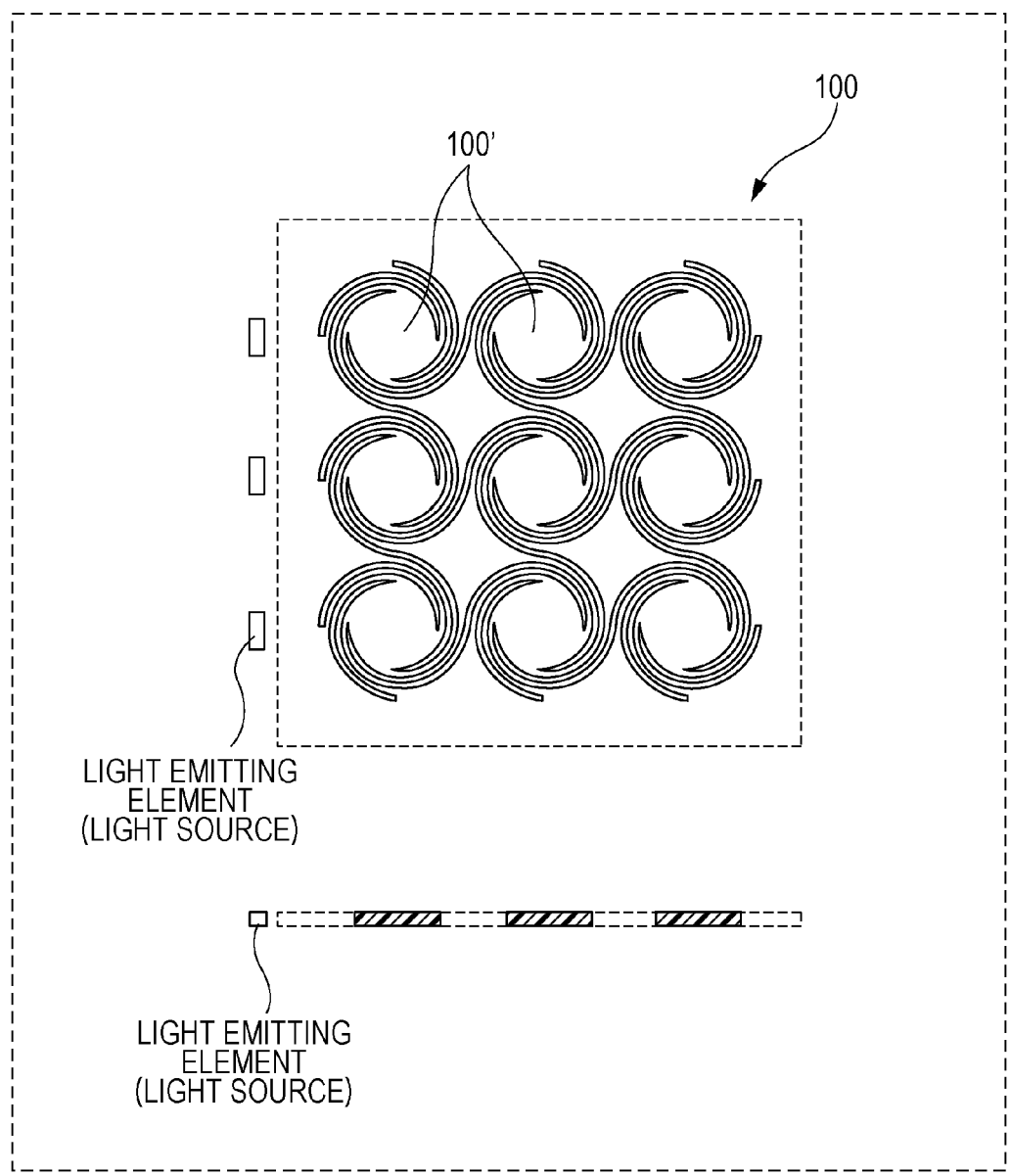

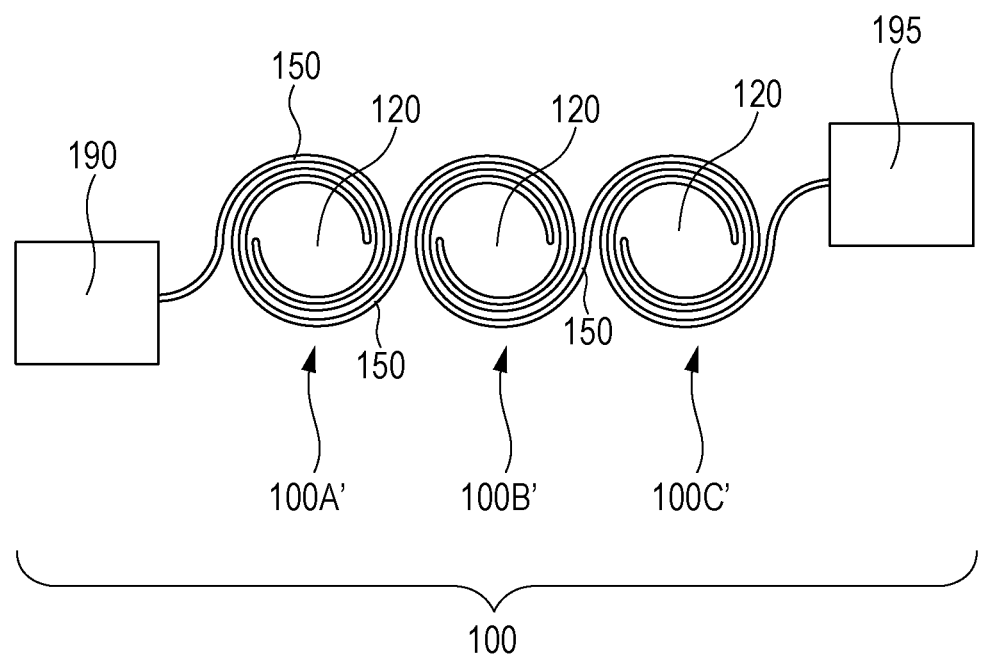

FLEXIBLE OPTICAL SUBSTRATE

BACKGROUND

1. Technical Field

The present disclosure is related to a flexible optical substrate. More specifically, the present disclosure is related to a flexible optical substrate that exhibits elastic characteristics.

2. Description of the Related Art

Nowadays, a great number of flexible substrates having flexibility are being used due to miniaturization and thinner dimensions of electronic devices. Application of a substrate having flexible characteristics to various devices is being studied, the various devices including mobile devices for which miniaturization has been demanded. For instance, application of such a substrate to a wearable device is being studied, the wearable device desirably having flexible characteristics that allow the device to conform to the motion of a user (see, for example, Japanese Unexamined Patent Application Publication No. 2004-71562, No. 2004-349002, No. 2013-145842, No. 2014-162124, and No. 2011-070777).

Examples of expected wearable device include a sensor device, when attached to a human body, is capable of sensing with high accuracy, and a display device that conforms to the motion of a human body and three-dimensional depressions and projections. Such a device has to be attached to a joint or a movable part of a human body without difficulty, and a feeling of wearing fitted to the motion of a user and design are considered to be important. Therefore, for a flexible substrate to be used in a wearable device, not only flexibility but also elasticity is demanded.

SUMMARY

One non-limiting and exemplary embodiment provides a flexible optical substrate that may be used as an optical substrate.

In one general aspect, the techniques disclosed here feature a flexible optical substrate that that allows incident light or optical signals to be propagated or transmitted therethrough. The flexible optical substrate includes unitary elastic structures. Each of the unitary elastic structures includes a film-like resin material that has a central portion and one or more strips provided outwardly of the central portion. One end of each of the one or more strips is connected to the central portion. Each of the unitary elastic structures has a clearance. Two adjacent unitary elastic structures are linked by at least part of the strips of the two adjacent unitary elastic structures.

The flexible optical substrate of the present disclosure is flexible and may be used as an optical substrate.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a schematic diagram for explaining a preliminary idea leading to devising of a flexible optical substrate according to an aspect of the present disclosure;

FIGS. 11A to 11C are schematic plan views schematically illustrating other desired configurations of a flexible light guide substrate;

FIG. 12 is a schematic plan view schematically illustrating the configuration of a flexible optical waveguide substrate;

Figure 1:
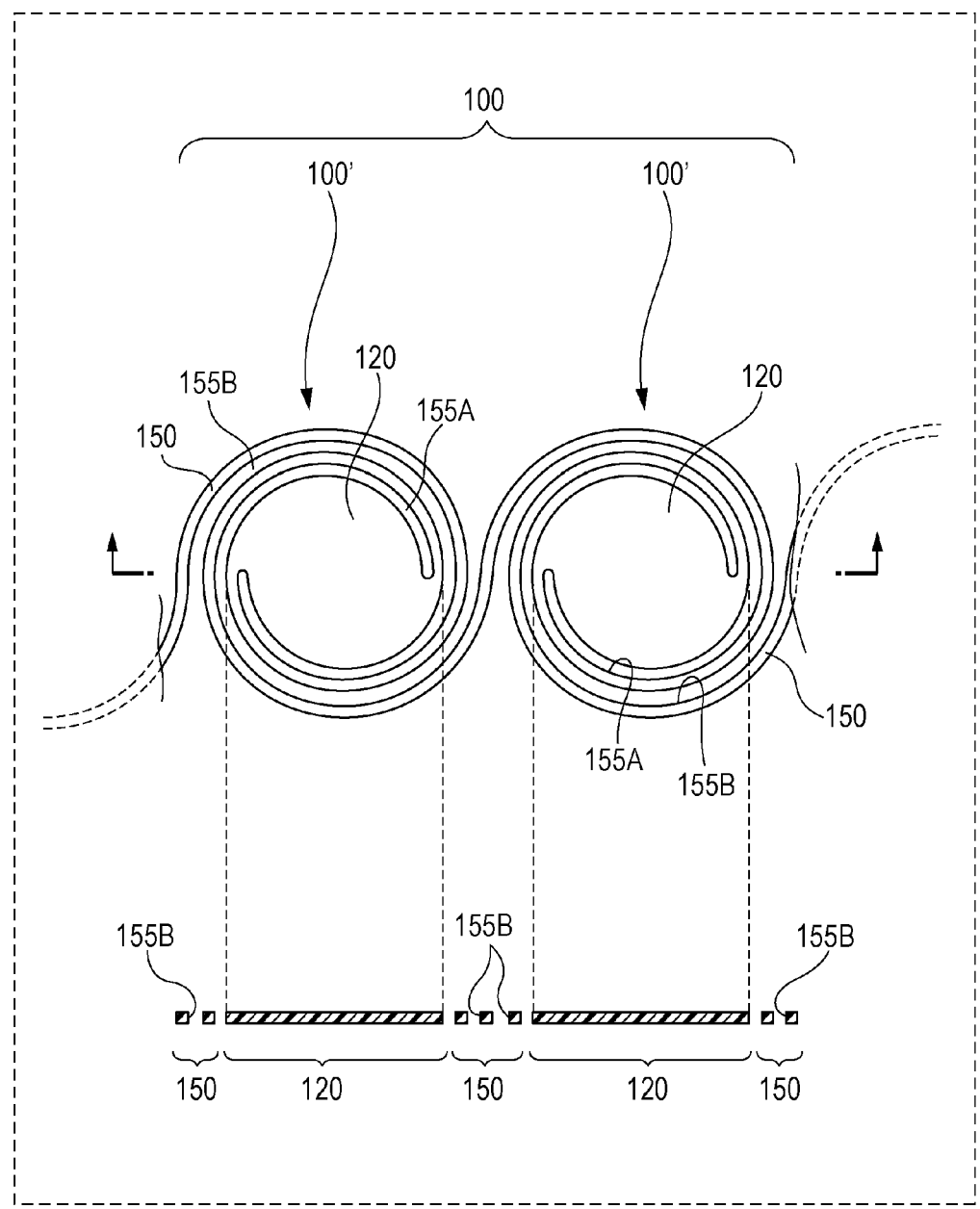
FIG. 1 depicts a schematic plan view and a sectional view schematically illustrating the configuration of a flexible optical substrate according to an aspect of the present disclosure.

DETAILED DESCRIPTION (Underlying Knowledge Forming Basis of the Present Disclosure)

The present inventors have found a specific problem that arises when a flexible substrate that exhibits elasticity is utilized as an optical substrate such as a light guide plate or optical waveguide, and have revealed the present disclosure. Specifically, it was found that when elasticity is imparted to a flexible substrate which is used as a light guide plate or optical waveguide, a problem related to the flexibility or elasticity may occur. In particular, when a substrate is bent and/or stretched, undesired stress is often applied to the substrate. This degrades the optical characteristics of the flexible substrate or causes the flexible substrate to be likely to be physically damaged or broken.

In general, when a solid plate-like portion of a light guide plate is bent or stretched, a stress is likely to be concentrated on a specific portion such as a bent portion. Thus, when stretching of a light guide plate is repeated, there is a possibility that the optical characteristics may be degraded at a local portion of the light guide plate or the light guide plate may be damaged or broken at a local portion. This problem is the same as in the case of an optical waveguide. The stretching is performed in a form of multi-layered structure which is provided with a diffusion sheet, a reflective layer or the like on the front side or back side of the light guide plate. Therefore, stress is likely to be concentrated particularly on a local portion due to such a multi-layered structure or concavo-convex shape, and interfacial debonding or cracking may be caused.

Regarding the flexibility, restrictions on the material and structure of a substrate are relatively severe. For instance, when a less flexible resin material is used for a light guide plate/optical waveguide, a desired shape has to be formed in advance or a thickness dimension or the like has to be reduced in order to achieve flexibility. More specifically, as an example, when a less flexible resin material such as polymethylmethacrylate (PMMA) or polycarbonate is used for a light guide plate (in other words, when a resin material which has high transparency and suitable for optical materials but has less flexibility is used), a desired shape such as a curved surface shape has to be formed in advance or the thickness of the light guide plate has to be reduced. However, in order to form a desired shape in advance, mold machining is needed for each molded article, and thus production time and cost are increased and it is not possible for the light guide plate to be arranged with deformed into a shape other than a predetermined shape. In addition, when the size of the light guide plate/optical waveguide is reduced more than necessary, the structural strength is disadvantageously reduced, and breakage and/or damage may be caused.

The present inventors have intensively studied in order to provide a desirable technology for a flexible substrate which is used as an optical substrate. More specifically, the present inventors have intensively studied in order to provide a technology which contributes to the achievement of a highly reliable optical substrate that exhibits different elasticity from that of a flexible substrate in related art.

Thus, the present inventors tried to achieve the aforementioned object by adopting a new approach and not adopting an extension of related art. As a result, the present inventors have devised a flexible optical substrate that solves the aforementioned problems. The present disclosure provides a desirable technology for a flexible substrate which is used as an optical substrate. Specifically, in a flexible optical substrate according to an embodiment of the present disclosure, when the substrate is bent and/or stretched, undesired stress is unlikely to be applied to the substrate, and thus the possibility of damage and/or breakage of the substrate is reduced.

A flexible optical substrate according to an aspect of the present disclosure allows incident light or optical signals to be propagated or transmitted therethrough. The flexible optical substrate includes unitary elastic structures. Each of the unitary elastic structures includes a film-like resin material that has a central portion and one or more strips provided outwardly of the central portion. One end of each of the one or more strips is connected to the central portion. Each of the unitary elastic structures has a clearance. Two adjacent unitary elastic structures are linked by at least part of the strips of the two adjacent unitary elastic structures. The flexible optical substrate and the unitary elastic structures extend and contract, or stretch and recover in not only a horizontal direction (i.e. perpendicular to the thickness direction of the flexible optical substrate), but also a vertical direction (i.e. parallel to the thickness direction of the flexible optical substrate) due to the above described structure.

Each of the one or more strips may have a form which is at least partially curved. In addition, each of the one or more strips may be curved to make turns around the central portion. The at least part of the strips, which connects the two unitary elastic structures, may be curved to have an inflection point. The flexible optical substrate may be freely stretchable due to changes of curvatures of the one or more strips. The unitary elastic structures may be arranged in one direction or may be arranged in one direction and in other direction crossing the one direction. The flexible optical substrate may further include a sealing resin layer in which the unitary elastic structures are totally sealed. The sealing resin layer may be more flexible than the film-like resin material.

The flexible optical substrate may be a flexible light guide substrate or a flexible optical waveguide substrate. Each of the central portion and/or the one or more strips may include a first region including a resin having a first optical refractive index and a second region including a resin having a second optical refractive index lower than the first optical refractive index. The flexible optical substrate may be the flexible light guide substrate, in which each of the central portion and/or the one or more strips may have a first surface from which the propagated or transmitted light is emitted and a second surface that is provided on an opposite side of the first surface. The flexible optical substrate may further include a reflective layer that is provided on the second surface of the central portion and/or the one or more strips, and that is a resin layer having a refractive index lower than a refractive index of the film-like resin material.

The flexible optical substrate may be the flexible light guide substrate, in which each of the central portion and/or the one or more strips may have a first surface from which the propagated or transmitted light is emitted. The flexible optical substrate may further include an optical diffusion layer that is provided on the first surface of the central portion and/or the one or more strips. The flexible optical substrate may be the flexible light guide substrate, and the flexible optical substrate may further include at least one light emitting element that faces a side face of the unitary elastic structures.

The flexible optical substrate may be the flexible optical waveguide substrate. In each of the central portion and/or the one or more strips, the first region may be a layered region, and the second region may include two layers that interpose the first region, and a region that is provided on a circumferential edge of the central portion and/or the strips and that links the two layers together. The flexible optical substrate may be the flexible optical waveguide substrate, and the flexible optical substrate may include at least one pair of a light emitting element and a light receiving element, the light emitting element and the light receiving element being optically connected to each other by at least part of the unitary elastic structures. The light emitting element may face a first side face of the unitary elastic structures, and the light receiving element may face a second side face different from the first side face.

When a light guide plate or an optical waveguide in related art is bent or stretched, stress is likely to be concentrated on a local portion such as a bent portion or an stretched portion, which causes degradation of optical characteristics and/or damage, breakage. When a flexible optical substrate according to an aspect of the present disclosure is stretched, due to changes of the forms of strips (particularly, by changing the forms of strips so that the curvatures of the strips change), the substrate is stretched. Thus stress is not concentrated on a specific point, and stretching of the substrate and/or bending of the substrate are achieved. In other words, since stress is not concentrated on a local portion, degradation of optical characteristics and/or damage, breakage of the substrate are avoided. Also, since stretching and bending of the substrate are achieved naturally in this manner, the substrate does not have to be made thinner more than necessary in order to impart flexibility to the substrate. Regarding the stretch rate of a substrate, a flexible optical substrate according to an aspect of the present disclosure enables a large stretch rate to be achieved by changing the forms of strips (for instance, by changing the curved forms and increasing the number of turns or the number of winding of strips which are curved to make turns).

Also, the flexible optical substrate according to an aspect of the present disclosure has a relatively high degree of freedom in the direction of stretching. Therefore, it is also possible to bend the substrate in a curve and/or to stretch the substrate. In other words, the resin substrate does not have to be formed in a curved shape in advance. In addition, in the flexible optical substrate according to an aspect of the present disclosure, stress is not concentrated on a single point and bending and stretching of the substrate are allowed due to form change of strips (particularly, form change that causes changes of the curvatures of the strips), and thus a resin material, which has high transparency but has less flexibility, may also be proactively adopted as a substrate material.

Hereinafter, a flexible optical substrate according to an aspect of the present disclosure will be described in detail with reference to the drawings. It is to be noted that various elements in the drawings are schematically illustrated only for the sake of understanding the present disclosure, and dimensional ratios and external appearance may be different from the real ones. In the description below, the same reference numerals are given to the same or similar parts. Overlapping explanation may be omitted

[Flexible Optical Substrate of Present Disclosure]

FIG. 1 schematically illustrates the configuration of a flexible optical substrate 100 according to an aspect of the present disclosure. As illustrated, the flexible optical substrate 100 includes unitary elastic structures 100'. Each of the unitary elastic structures 100' has a basic structure for achieving at least substrate stretching. Since the unitary elastic structures 100' provide the basic structure of the flexible optical substrate 100, the substrate exhibits elastic characteristics and/or bending characteristics. In other words, the unitary elastic structure in the present disclosure indicates a minimum unit structure of substrate for achieving characteristics such as substrate stretch and/or substrate bending characteristics.

In the present description, a flexible optical substrate refers to a flexible substrate in which light is utilized. For instance, a flexible optical substrate is a flexible substrate that is configured to allow incident light or optical signals to be propagated or transmitted through the substrate.

The unitary elastic structure 100' is formed of a film-like resin material including a central portion 120 and a strip 150. More specifically, the unitary elastic structure 100' is composed of a film-like resin material including a central portion 120 and one or more strips 150, one end of each of which is connected to the central portion and which are provided outwardly of the central portion". As seen from the illustrated form, the central portion 120 occupies a relatively wide area in the unitary elastic structure 100', and the strips 150 are positioned so as to occupy a relatively narrow area around the circumferential edge of the central portion 120. As illustrated, the strip used in the present description indicates a member having an elongated form as a whole. In particular, the strips are resin members that extend in an elongated manner on the same plane.

The unitary elastic structure in the present aspect is composed of a film-like resin material. Thus, the central portion 120 and the strip 150 are both composed of a resin and have a thin film form. In an aspect, the central portion 120 and the strip 150 are both composed of a resin only. That is, the unitary elastic structure forms a resin structure and both the central portion 120 and the strip 150 are resin members. In the present disclosure, film-like means that the thickness of the central portion 120 and the strip 150 is several tens of μm to several mm. The following is provided only as an illustration: the specific thickness of the central portion 120 and the strip 150 may be approximately 0.1 to 5 mm. In an aspect, the thicknesses of the central portion 120 and the strip 150 are essentially the same because both are formed of the same sheet member. Because of the same reason, the central portion 120 and the strip 150 are positioned on essentially the same plane when an external force is not particularly applied.

The material of the film-like resin material of which the unitary elastic structure is composed is not particularly restricted as long as the material allows a film form. As an illustration, the film-like resin material may be formed of at least one type of resin selected from the group consisting of polyethylene terephthalate (PET), polyethylene naphthalate (PEN), polyether ether ketone (PEEK), polyimide (PI), and liquid crystal polymer. It is to be noted that when optical characteristics such as transparency and/or molding characteristics are considered to be particularly important, the film-like resin material is desirably formed of at least one type of resin selected from the group consisting of poly methyl methacrylate (PMMA), polycarbonate, silicone rubber, acrylic-based resin, polyolefin-based resin, and fluorine-based resin. In addition, transparent rubber such as urethane rubber and urethane-based elastomer may be used as the material of the film-like resin material.

In the flexible optical substrate 100 according to an aspect of the present disclosure, adjacent unitary elastic structures are linked by the strip 150. Specifically, adjacent unitary elastic structures 100' are connected to each other via the strip 150. As seen from the illustrated aspect, adjacent unitary elastic structures 100' are connected to each other so as to share the strip 150, and thus the adjacent unitary elastic structures 100' are inked substantially seamlessly.

The unitary elastic structure 100' is provided with a clearance. As illustrated in FIG. 1, it is desirable that a clearance 155A be provided at least between the central portion 120 and the strip 150. In other words, the central portion 120 and the strip 150 have a form in which both are separated from each other. As illustrated, in the unitary elastic structure 100', the clearance 155A may have a substantially uniform width dimension or have a symmetrical form as a whole. As illustrated in FIG. 1, it is more desirable that a clearance 155b be provided between the strips. In other words, it is desirable that the strips extend with a clearance without overlapping with each other. As illustrated, in the unitary elastic structure 100', the clearance 155B may have a substantially uniform width dimension or have a symmetrical form as a whole.

The strip 150 of the unitary elastic structure 100' extending in an elongated form may have a form which is at least partially curved. In other words, the strip 150 may not linearly extend from the central portion 120 as the starting point, but may extend non-linearly so as to smoothly curve. More specifically, it is desirable that the strips 150 extend from the central portion 120 non-linearly so as to smoothly curve with the central portion 120 and the strips 150 positioned on essentially the same plane.

The flexible optical substrate 100 according to an aspect of the present disclosure is desirably freely stretchable due to changes of the curvatures of the strips 150. In other words, in an aspect, when the flexible optical substrate 100 is stretched or contracted to its original form, the curvature of the strip 150 of each unitary elastic structure 100' changes. In particular, as the flexible substrate 100 is stretched, the curvature of each strip 150 positioned outwardly of the central portion 120 changes to a smaller value compared with the curvature before the stretching.

In an aspect, the strip 150 has a curved form as a whole. For instance, as illustrated in FIG. 1, the strips 150 may be curved to make turns around the central portion 120. In other words, the strips 150 may extend from the central portion 120 so as to wind, with the central portion 120 and the strips 150 positioned on essentially the same plane. In this case, it is desirable that the clearance 155A be provided between the central portion 120 and the strips 150, and the clearance 155B be provided also between the strips 150 in a turning form or a winding form. In the case of a turning form or a winding form, it is possible to regulate the stretch rate of the substrate by adjusting the number of turning or the number of winding of the strips. For instance, it is possible to raise the stretch rate of the substrate by increasing the number of turning or the number of winding of the strips.

The curved form of the strips 150 which make turns around the central portion 120 is based on the idea illustrated in FIG. 2. Specifically, as illustrated in FIG. 2, the curved form is based on the idea that when the form of a substrate is designed based on the strips which are curved to make turns, for instance, in a clockwise direction (or a counterclockwise direction) around the central portion, stress is not concentrated on a single point and may be distributed.

As seen from the illustrated aspect, between adjacent unitary elastic structures, one end of the strip 150 extends from the outer circumference of the central portion 120 belonging to one of the unitary elastic structures, and the other end is connected to a strip of the other of the unitary elastic structures. For instance, in the flexible optical substrate 100 illustrated in FIG. 1, the strips 150 each have a form which is curved approximately 180 degrees along the outer circumference of the central portion 120. In the present disclosure, the angle of a portion of the strip 150 may be regarded as a curve central angle, the portion being provided in a curve along the outer circumference of the central portion around a base point at the center of the central portion 120. The curve central angle may have various values. For instance, the strip 150 may be provided to be curved approximately 30 degrees along the outer circumference of the central portion 120, or provided to be curved approximately 120 degrees along the outer circumference of the central portion 120. Desirably, the strip 150 is curved approximately 60 degrees or more along the outer circumference of the central portion 120 in order to increase arrangement patterns of adjacent unitary elastic structures. In addition, the strip 150 may be provided to be curved approximately 360 degrees or more along the outer circumference of the central portion 120. When the strip 150 is curved approximately 360 degrees or more along the outer circumference of the central portion 120, the strip 150 has a distinct winding form along the outer circumference of the central portion. The following is provided only as an illustration: the strip 150 may be in a form which is wound 1 to 3 times along the outer circumference of the central portion 120.

In an aspect of the flexible optical substrate 100 of the present disclosure, the center (central point) of the central portion 120 and the curve center of the strip 150 are located essentially the same location (in particular, before stretching). In another aspect, at least two strips 150 are symmetrically arranged with respect to the central point of central portion 120.

As described above, as the flexible substrate 100 is stretched, the curvature of each strip 150 in the unitary elastic structure changes to a smaller value compared with the curvature before the stretching. The curvature herein refers to the curvature of the curved-shaped portion in the strip (in other words, the degree of curve/the degree of bend of the strip), and the curvature is the reciprocal of the radius of curvature of the strip. According to a typical aspect, the strip 150 is deformed so as to be away from the outer circumference of the central portion 120, and the curvature is thereby reduced, which helps in stretching of the substrate. The flexible optical substrate 100 according to an aspect of the present disclosure is stretched due to changes of the curvatures of the strips 150 connected to the central portion 120, and thus the entire strips contribute to the stretching and it is possible to distribute the stress at the time of stretching to the entire strips. Therefore, in the flexible optical substrate 100 according to an aspect of the present disclosure, concentration of stress is unlikely to occur inconveniently and occurrence of breakage or the like is reduced.

In addition, in the flexible optical substrate 100 according to an aspect of the present disclosure, it is possible to increase the length dimension of the strip 150 by increasing the central angle of the strip 150 which is curved along the central portion 120 or by increasing the number of winding, and thus high elasticity of the flexible optical substrate 100 may be achieved. In other words, it is possible to relatively reduce the dimension of the substrate in an initial state before stretching.

Figure 3A:
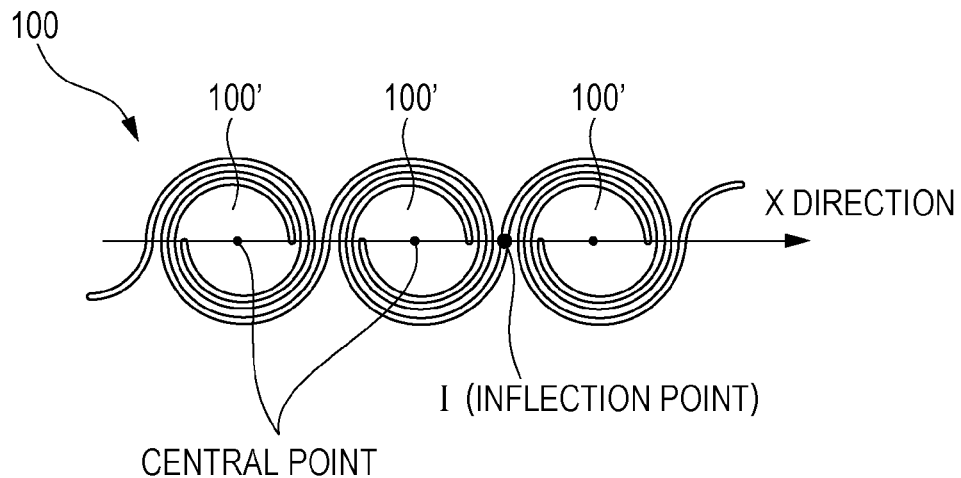
FIGS. 3A and 3B are schematic plan views schematically illustrating the arrangement forms of unitary elastic structures.

Since the flexible optical substrate 100 according to an aspect of the present disclosure includes unitary elastic structures 100', various arrangement forms of the unitary elastic structures 100' may be devised. In an aspect, as illustrated in FIG. 3A, unitary elastic structures 100' is arranged in one direction. In the illustrated aspect, the unitary elastic structures 100' are arranged in the X direction. Desirably, the unitary elastic structures 100' are arranged on the same plane so that the central points (for instance, centers of mass) of the respective central portions 120 of the unitary elastic structures 100' form a line when the central points are connected. Also in this case, adjacent unitary elastic structures 100' are connected to each other so as to share a strip 150, and thus the adjacent unitary elastic structures 100' are linked substantially seamlessly.

Figure 3B:
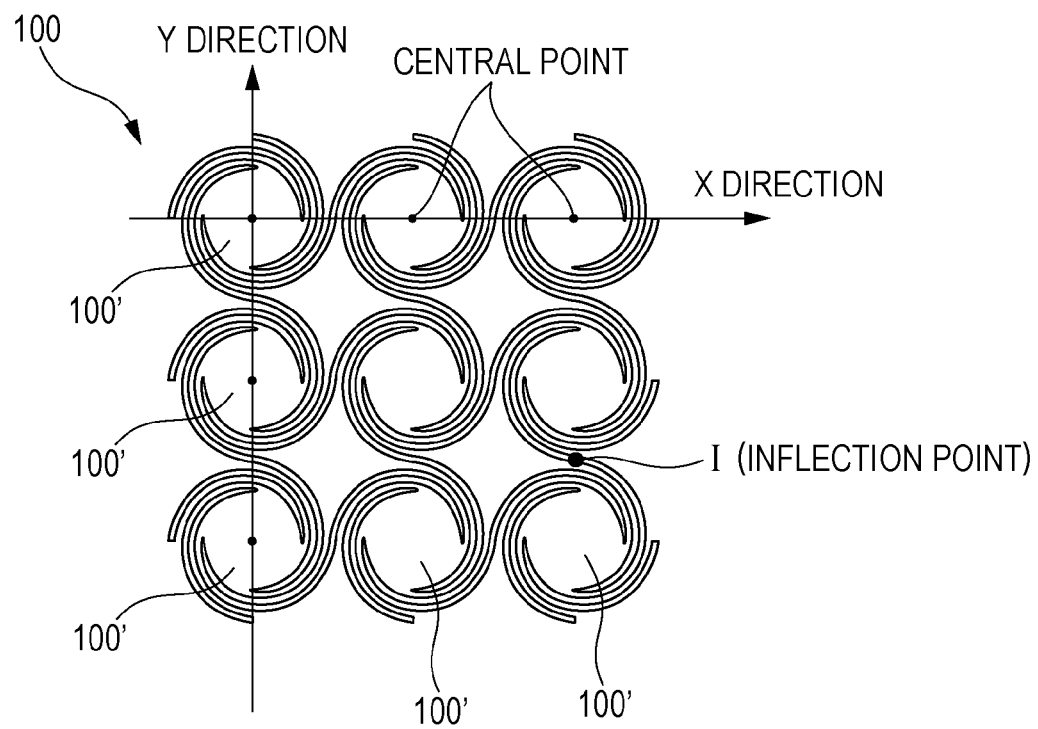

In another aspect, as illustrated in FIG. 3B, in addition to one direction, the unitary elastic structures 100' are arranged in other direction crossing the one direction. In the illustrated aspect, the unitary elastic structures 100' are arranged in the X direction as well as the Y direction crossing the X direction. Similarly, it is desirable that the unitary elastic structures 100' be arranged on the same plane so that the central points (for instance, centers of mass) of the respective central portions 120 of adjacent unitary elastic structures 100' form a line when the central points are connected. In the illustrated aspect, the unitary elastic structures 100' are arranged in two direction: the X direction and the Y direction crossing perpendicularly to the X direction. However, the X direction and the Y direction do not have to cross each other perpendicularly (in other words, the crossing angle does not have to be 90°). In the form as illustrated in FIG. 3B, the unitary elastic structures 100' are arranged so as to have regularity as a whole (for instance, the arrangement form of the unitary elastic structures 100' has symmetry), and thus the effect of improved structural strength of the entire substrate is expected.

As illustrated in FIGS. 3A and 3B, in an aspect, a strip which connect unitary elastic structures 100' is curved so as to have an inflection point I. In other words, one end of a strip of a unitary elastic structure is connected to the central portion, and the other end of the strip is shared by a strip of adjacent unitary elastic structure 100', and the strip in common is curved so as to have the inflection point I. Here, the inflection point means a point at which the curved form changes. For instance, when extending form of a strip on the plane is regarded as a single curve, an inflection point refers to a point at which the curve form changes from concave bend to convex bend (or a point at which the curve changes conversely). If a common strip between adjacent unitary elastic structures 100' has an inflection point like this, change of the form of the common strip becomes relatively large (for instance, change of the curvature of the common strip increases) when the substrate is stretched, and therefore, a high stretch rate of the substrate is achievable.

Figure 4:
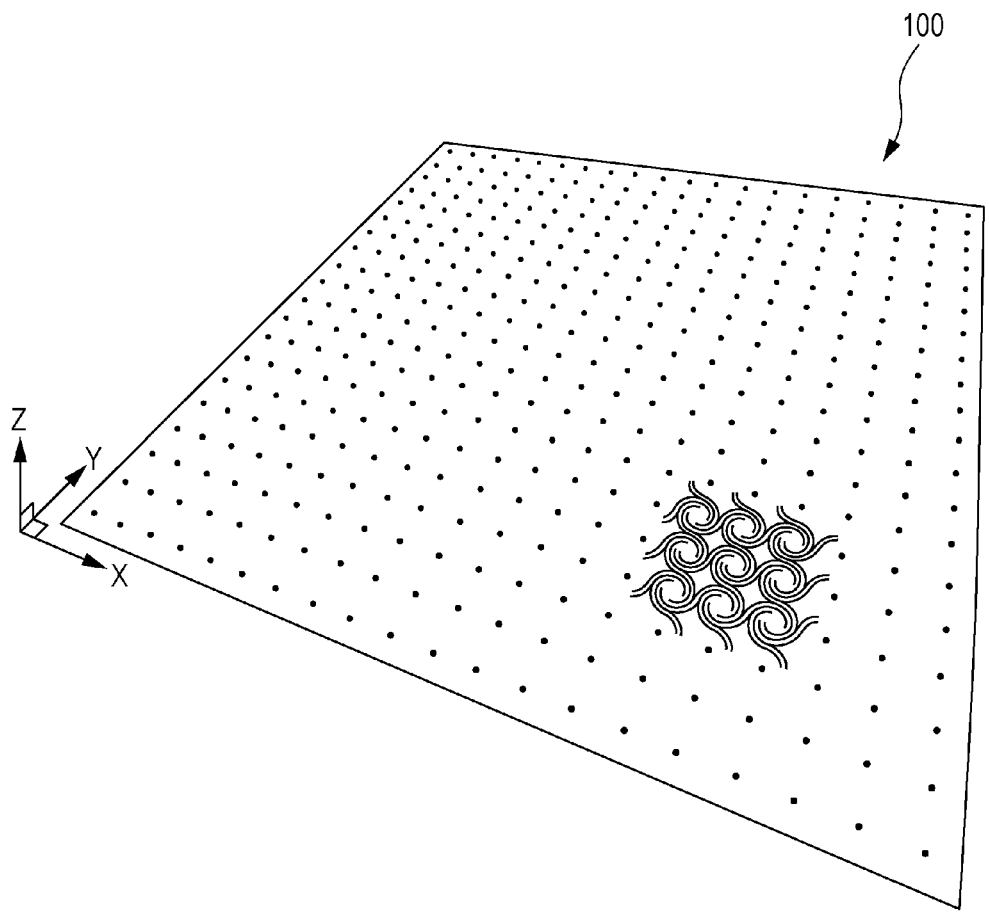
FIG. 4 is a perspective view schematically illustrating a flexible optical substrate having a form in which the unitary elastic structures are arranged in a matrix.
Figure 5:
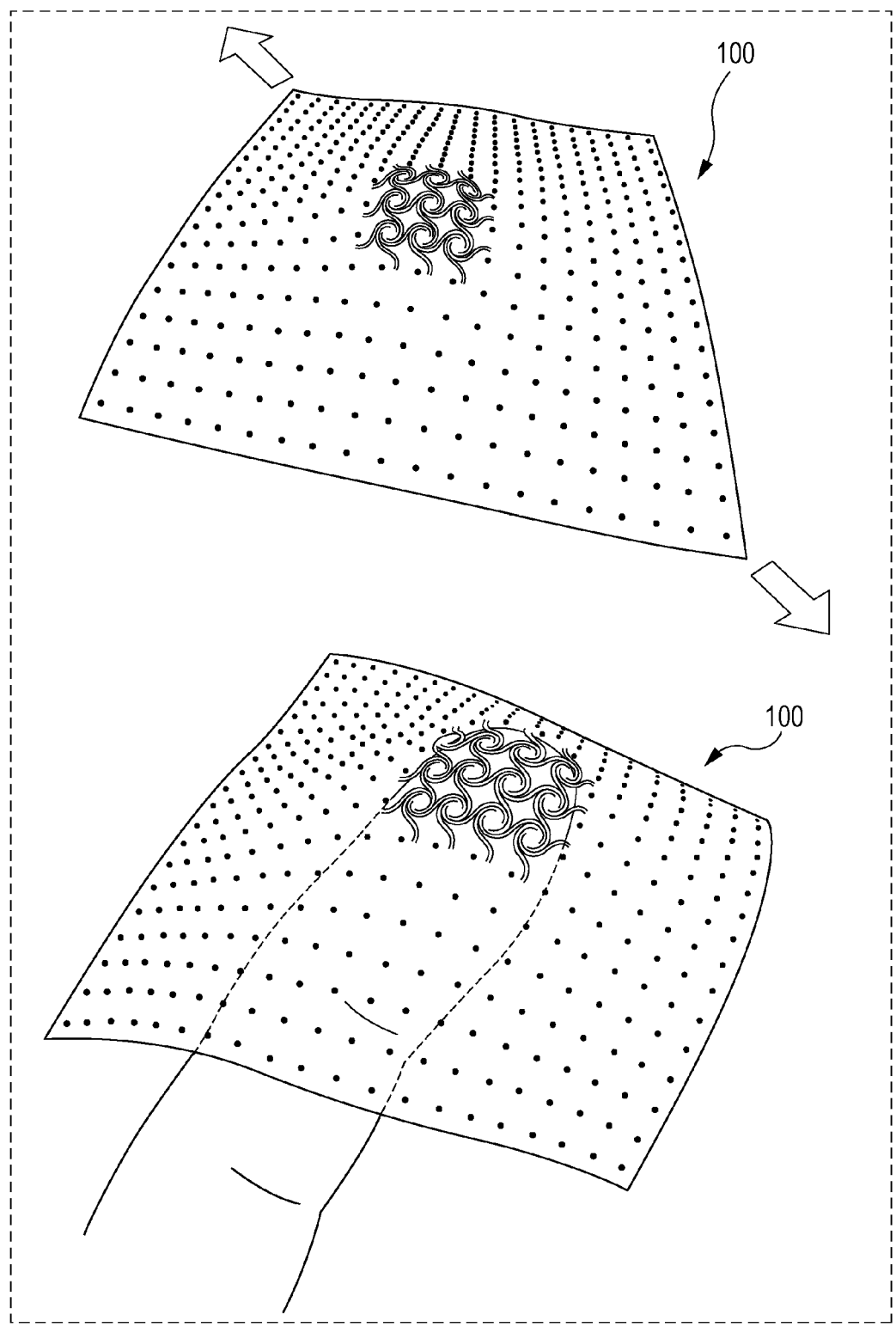
FIG. 5 is a perspective view schematically illustrating a flexible optical substrate having a form in which the unitary elastic structures are arranged in a matrix.
Figure 6A:
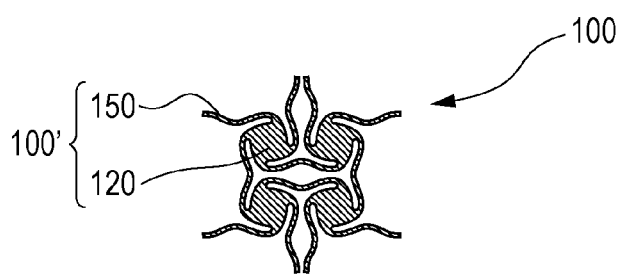
FIGS. 6A to 6D are schematic plan views illustrating various forms of the unitary elastic structures.
Figure 6B:
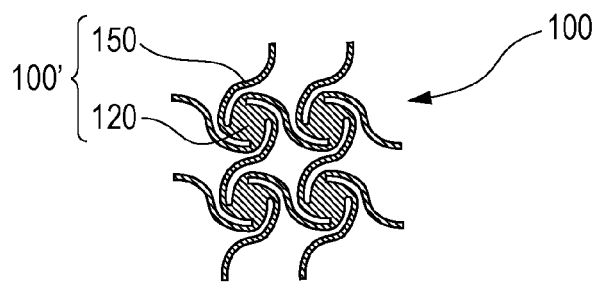
Figure 6C:
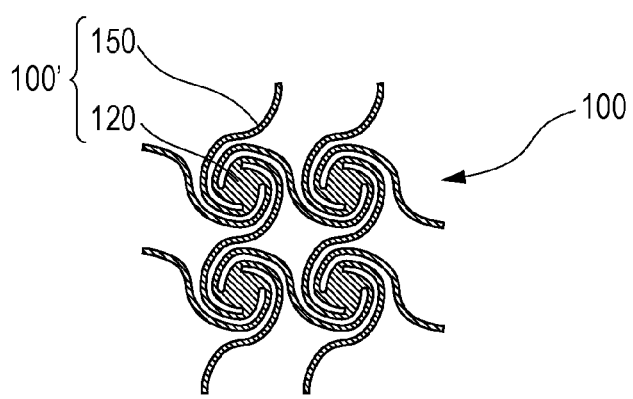
Figure 6D:
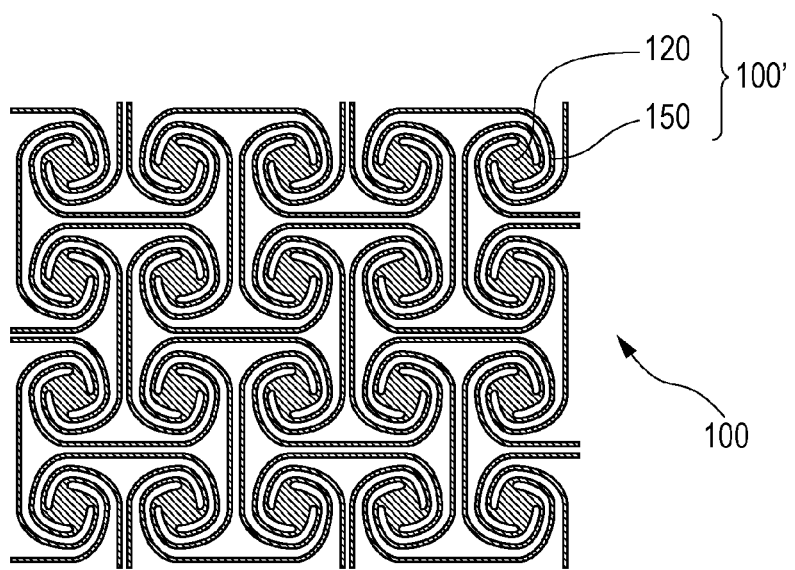

In the flexible optical substrate 100 according to an aspect of the present disclosure, due to the presence of the unitary elastic structures 100', stretching of the substrate is not restricted to one direction but may be performed in various directions. For instance, when the form (form in which the unitary elastic structures are arranged in a matrix) illustrated in FIG. 4 is taken as an example, stretching of the substrate is performed in the x direction which is a surface direction (a direction perpendicular to the thickness direction of the substrate) of the flexible substrate, stretching of the substrate is also performed in the y direction perpendicular to the x direction, and stretching of the substrate is also performed in the z direction perpendicular to both the x direction and the y direction. In addition, stretching of the substrate may also be performed in the direction of a vector formed by at least two of the x direction, the y direction, and the z direction. Therefore, as illustrated in FIG. 5 (particularly, the lower-side figure), the substrate is stretchable and/or bendable so as to conform a specific geometry such as a finger of a user, for instance. Consequently, the flexible optical substrate 100 according to an aspect of the present disclosure may be used for various applications.

In the flexible optical substrate 100, various forms (particularly, planar forms) of the unitary elastic structures 100' and various arrangement forms may be devised. For instance, the forms as illustrated in FIGS. 6A to 6D or the forms as illustrated in FIGS. 7A and 7B may be used.

In the aspects illustrated in FIGS. 6A to 6D, the planar shape of the central portion 120 is substantially a quadrilateral rather than a circular shape. Like this, the shape of the central portion 120 is not particularly restricted to a circular shape and may be a polygonal shape such as a quadrilateral or hexagonal shape other than a circular shape. When the shape of the central portion 120 is a polygon, it is desirable that round chamfering of the vertices of the polygon be performed correspondingly to the curve of the strip 150. Also, in order to increase the number of arrangement of adjacent unitary elastic structures, the central points of three adjacent central portions 120 may be arranged so as to be positioned at the vertices of an equilateral triangle. In other words, the central portions 120 of the unitary elastic structures 100' may be closest packed on a plane. It is to be noted that in the aspect illustrated in FIG. 6D, a common strip between adjacent unitary elastic structures 100' has no inflection point.

Figure 7A:
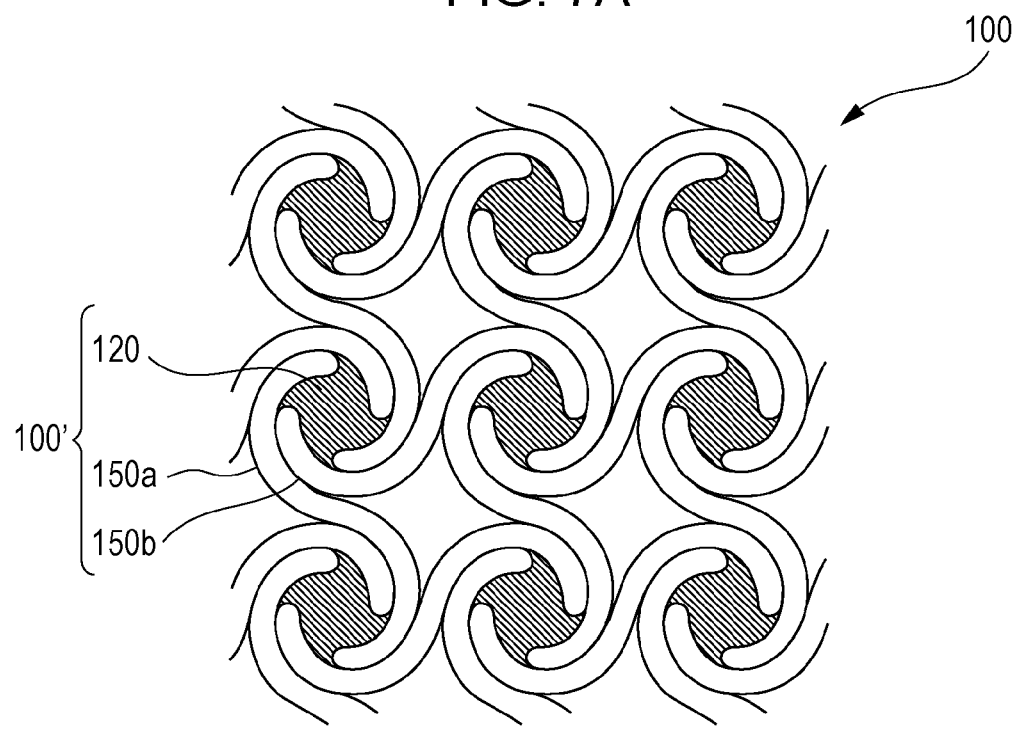
FIGS. 7A and 7B are schematic plan views illustrating various forms of the unitary elastic structures.
Figure 7B:
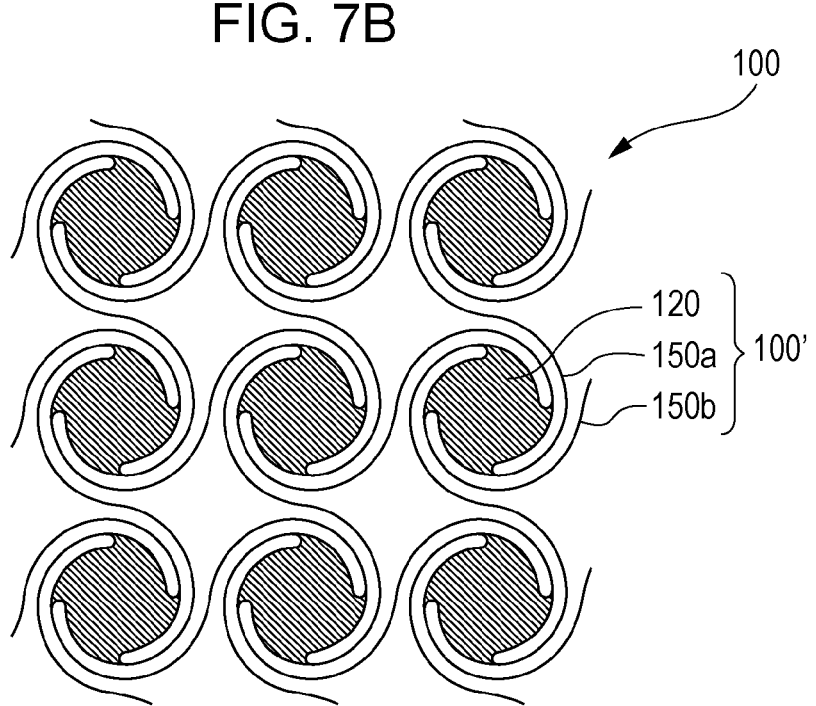

In the aspects illustrated in FIGS. 7A and 7B, two strips 150a, 150b extend so as to partially maintain mutually parallel relationship. As seen from the aspects illustrated in FIGS. 6A to 6D and FIGS. 7A and 7B, even with these forms, each unitary elastic structure is provided with a clearance and adjacent unitary elastic structures are linked by a strip. Thus, the same effect as in the flexible optical substrate 100 illustrated in FIGS. 3A to 5 may be achieved.

Figure 8:
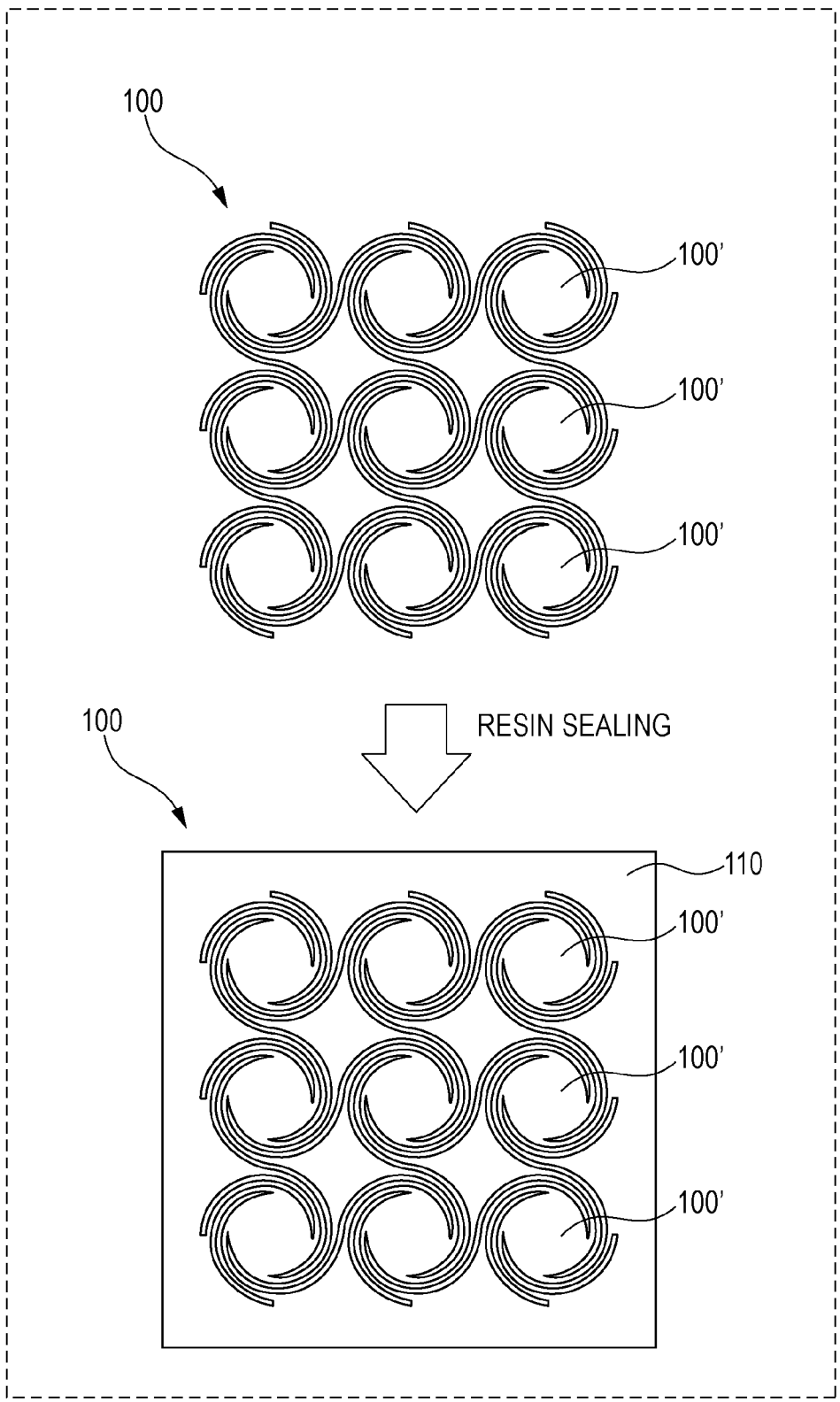
FIG. 8 is a schematic diagram for explaining a flexible optical substrate further having a sealing resin layer.

The flexible optical substrate 100 according to an aspect of the present disclosure may be covered with another resin in its entirety. More specifically, as illustrated in FIG. 8, the flexible optical substrate 100 according to an aspect of the present disclosure may further include a sealing resin layer 110 in which unitary elastic structures 100' are sealed totally. The presence of the sealing resin layer 110 enables the handling performance of the substrate 100 as an optical substrate to be enhanced.

When the sealing resin layer 110 is used, its material desirably has high stretchability. In particular, it is desirable that the sealing resin layer 110 be composed of a resin material which is more flexible than a film-like resin material (that is, the material of the central portion and the strips of a unitary elastic structure). Since the film-like resin material serves as the resin material of which the unitary elastic structure is composed, it is desired that the film-like resin material be composed of a hard material of a certain level. On the other hand, it is desired that the sealing resin layer 110 be composed of a flexible material which does not affect the elastic characteristics of the substrate adversely. That is, the sealing resin layer 110 is provided so as to seal the unitary elastic structures 100', and thus may function to integrally restrain the unitary elastic structures 100'. However, it is desirable that the sealing resin layer 110 have flexible characteristics which do not affect the change of the curvature of the strips 150 adversely. This improves the handling performance of the entire substrate and achieves the elastic characteristics of the substrate. It is to be noted that the sealing resin layer 110 may also be referred to as a stretch resin layer with reference to those matters.

A specific resin material of the sealing resin layer 110 is not particularly restricted as long as the specific resin material exhibits more flexible characteristics than the resin material (that is, the resin material of which the central portion and the strips are composed) for the unitary elastic structures 100'. For instance, the sealing resin layer 110 may include an elastomer material. The specific examples of the elastomer material include silicone rubber, acrylic rubber, fluoro rubber, and urethane rubber, and additionally include styrene-based thermoplastic elastomer, olefin-based thermoplastic elastomer, vinyl chloride-based thermoplastic elastomer, urethane-based thermoplastic elastomer, and amide-based thermoplastic elastomer.

In an aspect of the present disclosure, the flexible optical substrate is used as a light guide plate or an optical waveguide. In other words, the flexible optical substrate 100 according to an aspect of the present disclosure may be a flexible light guide substrate or a flexible optical waveguide substrate (see FIG. 9). The light guide plate causes a point light source to serves as a planar light emitting body, and the flexible optical substrate 100 is used as such a planar light emitting body. On the other hand, the optical waveguide performs optical communication by confining an optical signal within a resin core, and the flexible optical substrate 100 is used as such an optical communication unit.

It is desirable that the flexible light guide substrate or the flexible optical waveguide substrate be configured to allow incident light or optical signals to be propagated or transmitted through the substrate. For instance, in the case of the flexible light guide substrate, as illustrated in part (a) of FIG. 9, the opposite side face of a light output surface may be provided with a fine groove 130 in the central portion 120 and/or the strips 150 of each unitary elastic structure 100'. In this case, incident light (particularly, incident light through a side face of the flexible light guide substrate) into the flexible light guide substrate is reflected on the groove 130 and is efficiently guided to the light output surface. As illustrated in part (b) of FIG. 9, the opposite side face of a light output surface may be provided with a reflective layer 140 in the central portion 120 and/or the strips 150 of the unitary elastic structure 100'. In this case, incident light (particularly, incident light through the side face of the flexible light guide substrate) into the flexible light guide substrate is reflected on the reflective layer 140 and is efficiently guided to the light output surface.

The reflective layer 140 may be, for instance, a metal layer (for instance, a silver layer) or a resin layer having a desirable refractive index at a light reflection point. In addition, the flexible light guide substrate may be provided with an optical diffusion layer 160 in addition to or in replace of a reflection unit (see part (c) of FIG. 9). Specifically, the optical diffusion layer 160 may be provided in the light output surface of the central portion 120 and/or the strips 150 of the unitary elastic structure. The optical diffusion layer 160 like this causes light guided to the light output surface to scatter, and enables the entire light output surface to emit light more uniformly. Specific material and structure of the optical diffusion layer 160 are not particularly restricted and may be the same as the material and/or structure which are commonly used for an optical waveguide. The following is provided only as an illustration: a layer, in which resin beads having different refractive indices from those of the film-like resin material are distributed, may be used as the optical diffusion layer 160. It is to be noted that in the aspect illustrated in part (c) of FIG. 9, the reflective layer 140 and the optical diffusion layer 160 are positioned on the sides opposite to each other.

Figure 9:
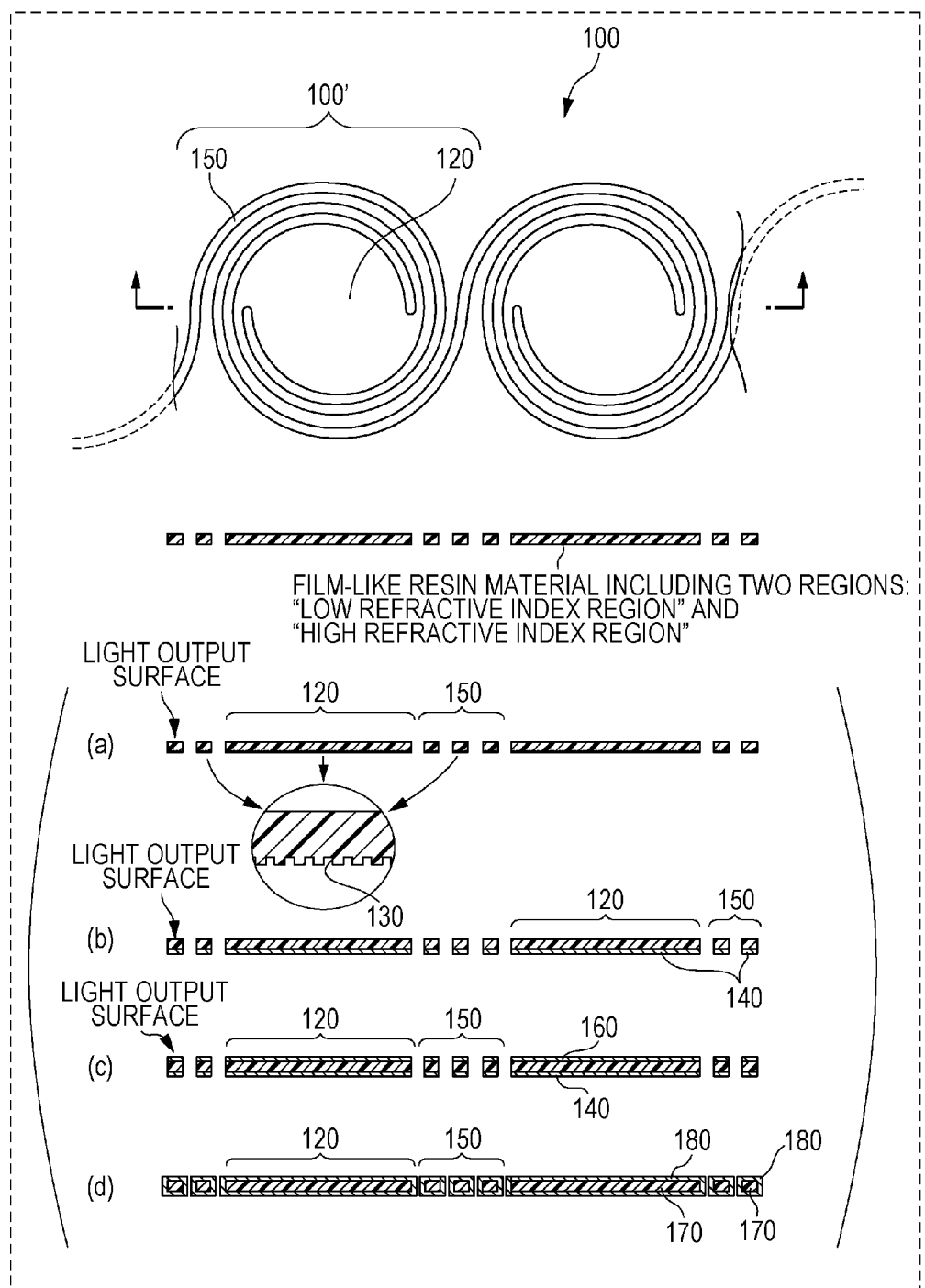
FIG. 9 depicts a schematic plan view and sectional views schematically illustrating the configuration of a flexible optical substrate which is used as a flexible light guide substrate or flexible optical waveguide substrate.

On the other hand, in the case of the flexible optical waveguide substrate, as illustrated in part (d) of FIG. 9, the central portion 120 and/or the strips 150 of the unitary elastic structure may be constituted by what is called a core layer 170 and a clad layer 180. Specifically, as described below, the central portion 120 and/or the strips 150 of the unitary elastic structure may be constituted by a layer (core layer) 170 having a relatively high optical refractive index and a layer (clad layer) 180 having a relatively low optical refractive index positioned on the periphery of the layer 170. This allows light to propagate in the substrate which may serve as the optical waveguide.

Because the propagation of light is important in both the flexible light guide substrate and the flexible optical waveguide substrate, in this regard, it is desirable that the film-like resin material of which the unitary elastic structure is composed corresponding to the material of the substrate have desirable refractive index characteristics. Specifically in the flexible light guide substrate and the flexible optical waveguide substrate, it is desirable that each of the central portion 120 and the strips 150 be constituted by at least two resin regions: a low refractive index region having a relatively low optical refractive index and a high refractive index region having a relatively high optical refractive index. The relatively low and relatively high referred herein essentially mean that the central portion 120 and the strips 150 have materials with different optical refractive indices. In other words, the central portion 120 and the strips 150 are composed of materials with different optical refractive indices so that light reflection occurs at the interface between the low refractive index region and the high refractive index region.

When the flexible optical substrate 100 is a flexible light guide substrate, the opposite side face of the light output surface is desirably provided with the reflective layer 140 in the central portion 120 and/or the strips 150 of the unitary elastic structure 100' The reflective layer 140 is desirably a layer that is formed of a low refractive index region. This enables incident light to the substrate to be guided to the light output surface efficiently with the lightweight characteristics of the resin maintained, thereby making it possible to further increase the luminous efficiency of the flexible light guide substrate. Similarly, when the flexible optical substrate is a flexible optical waveguide substrate, the low refractive index region is desirably provided so as to totally surround the high refractive index region. This causes the incident light (optical signal) to propagate while repeating reflection at the interface between the low refractive index region and the high refractive index region with the lightweight characteristics of the resin maintained.

The optical substrate as the flexible light guide substrate or the flexible optical waveguide substrate is achievable in various embodiments. Hereinafter, the various embodiments will be described.

First Embodiment

A first embodiment is related to an optical substrate particularly used as the flexible light guide substrate.

Figure 10:
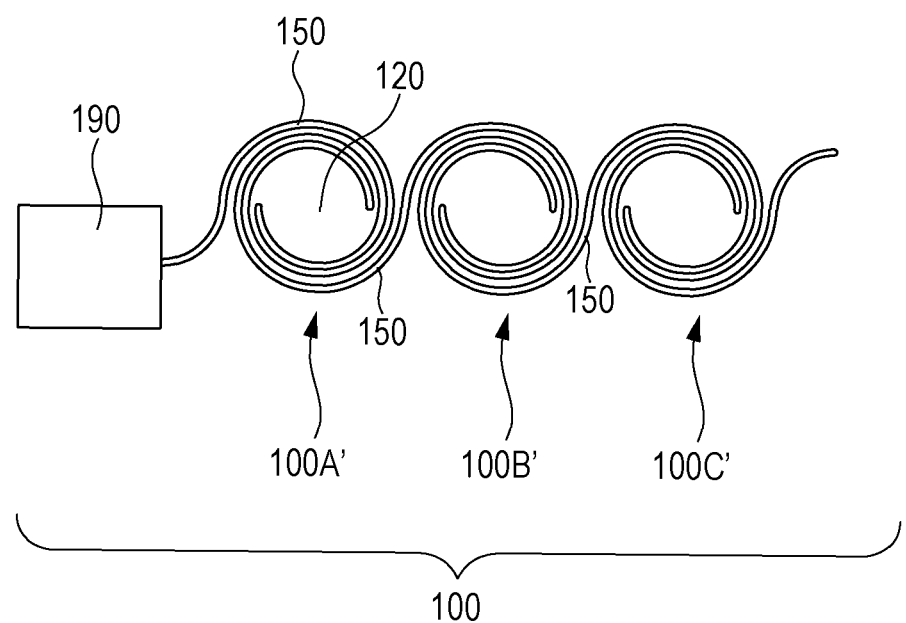
FIG. 10 is a schematic plan view schematically illustrating the configuration of a flexible light guide substrate.

A flexible light guide substrate 100 according to the first embodiment includes a first unitary elastic structure 100A', a second unitary elastic structure 100B', and a third unitary elastic structure 100C' that are provided side by side in one direction as illustrated in FIG. 10. Each of the first unitary elastic structure 100A', the second unitary elastic structure 100B', and the third unitary elastic structure 100C' is composed of a film-like resin material including the central portion 120 and two turned curve strips 150. (For instance, the film-like resin material is composed of a transparent resin.) Each of the two turned curve strips 150 is connected to the central portion 120 at one end and is curved to make turns along the outer circumference of the central portion 120. As the flexible light guide substrate 100 is stretched, the curvature of each turned curve strip 150 provided along the outer circumference of the central portion 120 changes to a smaller value compared with the curvature before the stretching. In other words, the turned curve strip 150 is stretched so as to be away from the outer circumference of the central portion 120. On the other hand, the central portion 120 does not change in shape at the time of stretching. Therefore, the flexible light guide substrate 100 is freely stretchable due to changes of the curvatures of the turned curve strips 150 provided along the outer circumference of the central portion 120.

As illustrated in FIG. 10, in the first unitary elastic structure 100A' and the second unitary elastic structure 100B', one of the turned curve strips 150 of the first unitary elastic structure 100A' and one of the turned curve strips 150 of the second unitary elastic structure 100B' are connected. Also, in the first unitary elastic structure 100A', one end of the other of the turned curve strips 150 is optically connected to a light source 190 (for instance, a light emitting element).

A light emitter such as a light emitting diode (LED) is used as the light emitting element that serves as the light source 190, and each of RGB light sources may be connected to the substrate. In the second unitary elastic structure 100B' and the third unitary elastic structure 100C', the other of the turned curve strips 150 of the second unitary elastic structure 100B' and one of the turned curve strips 150 of the third unitary elastic structure 100C' are connected. Like this, the flexible optical substrate 100 according to an aspect of the present disclosure includes at least one light source (for instance, a light emitting element) facing the side face. In other words, the flexible light guide substrate 100 is provided as the substrate including the light source 190 (for instance, a light emitting element) optically connected to the unitary elastic structures while exhibiting high elasticity due to the first to third unitary elastic structures 100A' to 100C'.

For instance, when a light emitting element (for instance, a light emitting diode) is provided as the light source 190 facing the side face of the flexible light guide substrate 100, light enters through the side of the film-like resin material. The incident light propagates via the turned curve strips 150 through the central portion 120 of each of the first unitary elastic structure 100A', the second unitary elastic structure 100B', and the third unitary elastic structure 100C', and thus each central portion 120 and the turned curve strips 150 emit light. Consequently, the flexible light guide substrate 100 as a whole emits light through the surface. The flexible light guide substrate 100 like this exhibits elastic characteristics, and may be provided, for instance, in a three-dimensional curved surface of the case of a device, the periphery of a drive unit, or a highly stretchable part of a human body in an installation and mounting free manner.

It is to be noted that in this embodiment, each of the central portion 120 and the turned curve strips 150 may additionally include a resin layer (a layer other than any layer included in the film-like resin material) on the front surface as a major surface or both front and back surfaces. In this case, it is desirable that the additional resin layer have a lower refractive index than that of any layer included in the film-like resin material. This is because the additional resin layer serves as a reflective layer for the light that has entered the layer included in the film-like resin material from the light source facing the side face of the flexible light guide substrate 100. Leakage of incident light from the film-like resin material to the outside may be protected by the additional resin layer having a lower refractive index like this, thereby making it possible to further increase the luminous efficiency of the flexible light guide substrate 100. In an aspect, the additional resin layer having a lower refractive index is provided in the back surface only, thereby achieving the flexible light guide substrate 100 that emits the propagated or transmitted light through the front surface. It goes without saying that a layer including the film-like resin material and the additional resin layer can be understood as one layer film-like resin material including two layers of different refractive indexes.

Figure 11B:
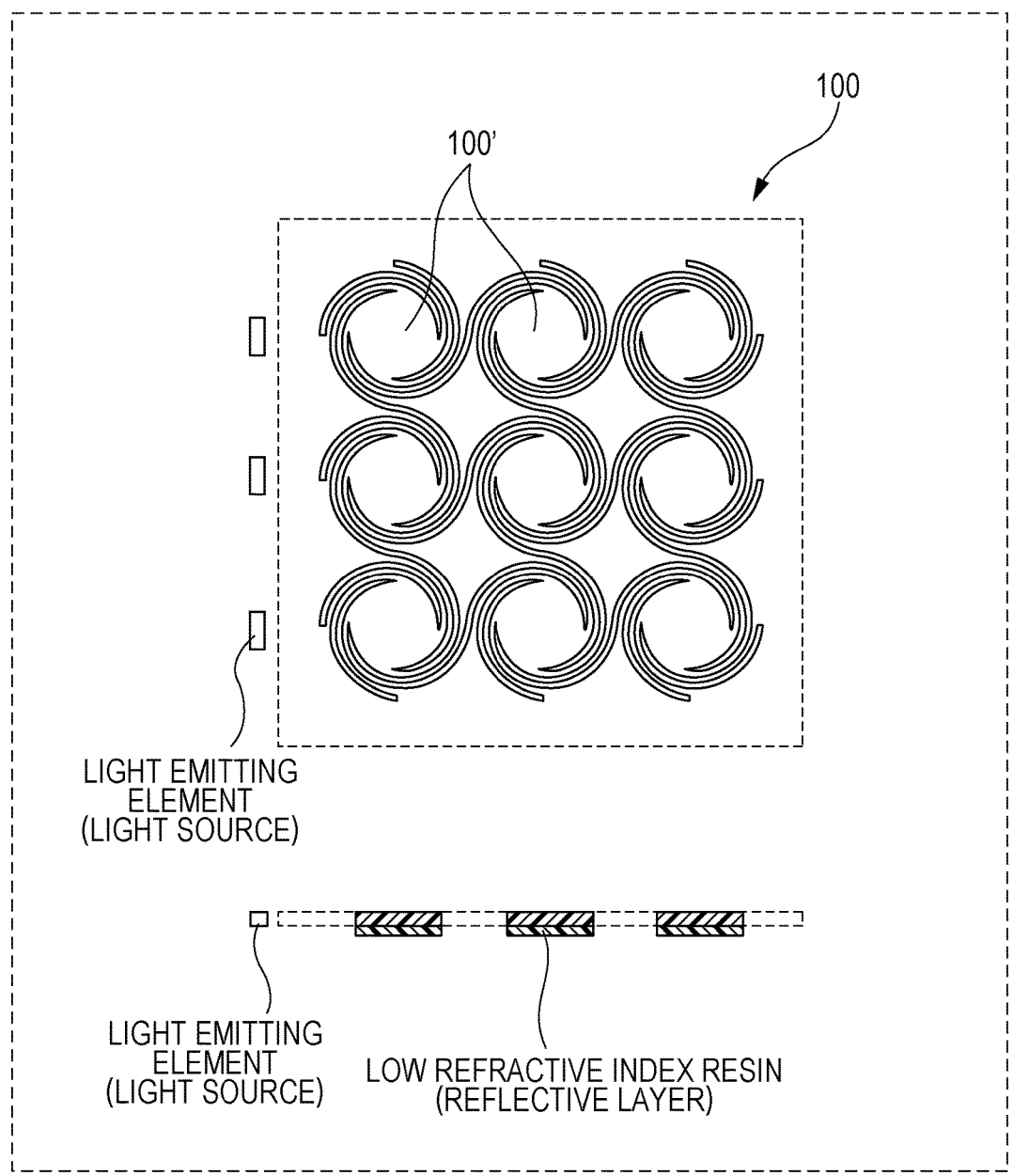
Figure 11C:
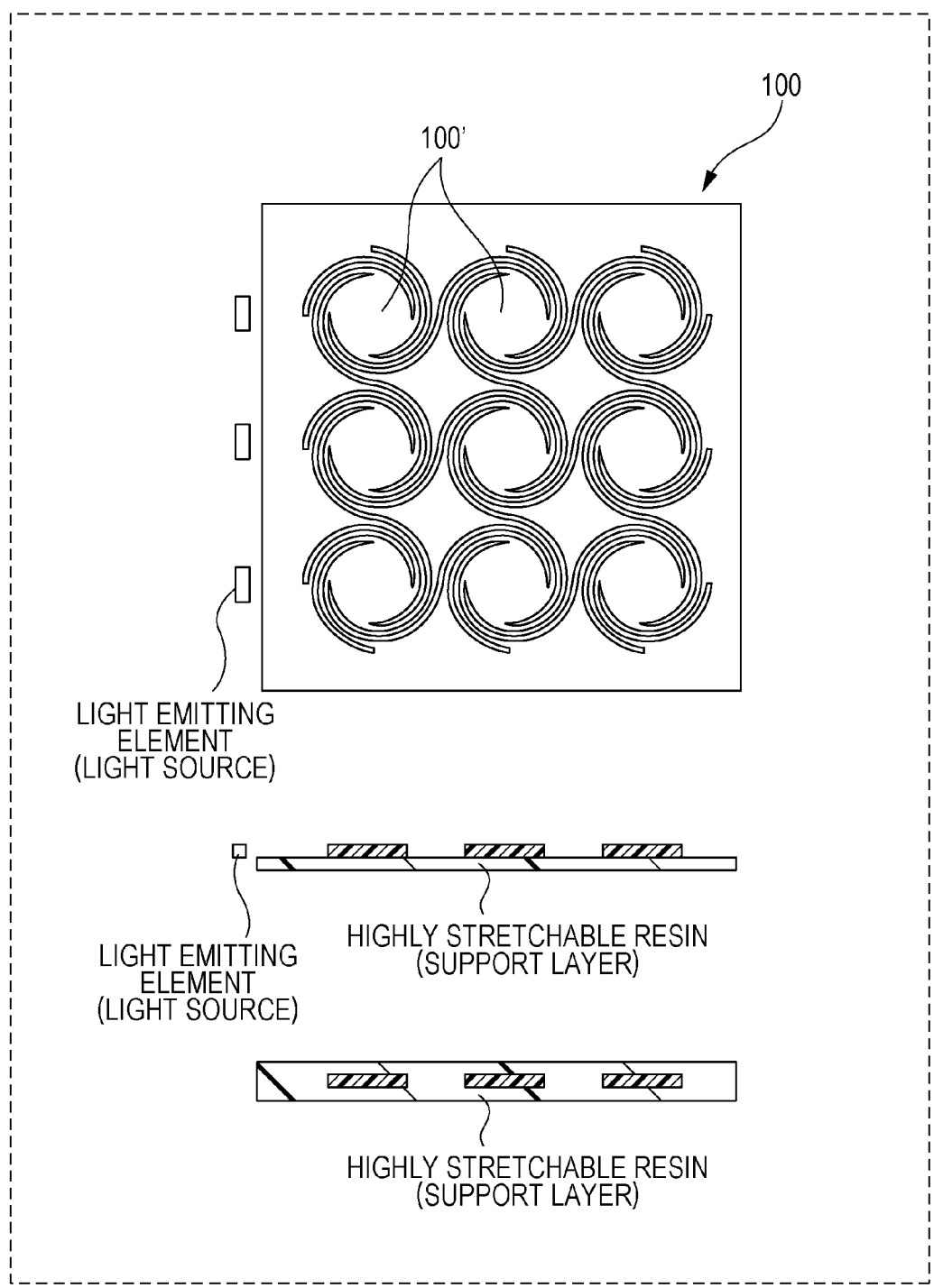

Various aspects of the flexible light guide substrate may be devised. For instance, the forms as illustrated in FIGS. 11A to 11C may also be devised. Specifically, the flexible light guide substrate 100 includes the unitary elastic structures 100' arranged in a matrix, and may include light emitting elements that allow light beams to enter from a side face in predetermined directions as illustrated in FIGS. 11A to 11C. Also in this aspect, light propagates through the unitary elastic structures 100' (the turned curve strips 150 and the central portion 120), and thus the substrate as a whole emits light. It is to be noted that the flexible light guide substrate 100 illustrated in FIG. 11B includes particularly a low refractive index resin (for instance, a reflective layer), and the flexible light guide substrate 100 illustrated in FIG. 11C includes particularly a highly stretchable resin as the sealing resin layer 110.

Second Embodiment

A second embodiment is related to an optical substrate particularly used as the flexible optical waveguide substrate.

A flexible optical waveguide substrate 100 according to the second embodiment is composed of a film-like resin material including a first unitary elastic structure 100A', a second unitary elastic structure 100B', and a third unitary elastic structure 100C' that are provided side by side in one direction as illustrated in FIG. 12. Each of the first unitary elastic structure 100A', the second unitary elastic structure 100B', and the third unitary elastic structure 100C includes the central portion 120 and two turned curve strips 150. Each of the two turned curve strips 150 is connected to the central portion 120 at one end and is curved to make turns along the outer circumference of the central portion 120. As the flexible optical waveguide substrate 100 is stretched, the curvature of each turned curve strip 150 provided along the outer circumference of the central portion 120 changes to a smaller value compared with the curvature before the stretching. In other words, the turned curve strip 150 is stretched so as to be away from the outer circumference of the central portion 120. On the other hand, the central portion 120 does not change in shape at the time of stretching. Therefore, the flexible optical waveguide substrate 100 is freely stretchable due to changes of the curvatures of the turned curve strips 150 provided along the outer circumference of the central portion 120.

As illustrated in FIG. 12, in the first unitary elastic structure 100A' and the second unitary elastic structure 100B', one of the turned curve strips 150 of the first unitary elastic structure 100A' and one of the turned curve strips 150 of the second unitary elastic structure 100B' are connected. Also, in the first unitary elastic structure 100A', one end of the other of the turned curve strips 150 is optically connected to a light source 190 (for instance, a light emitting element). A light emitter such as a light emitting diode (LED) is used as the light emitting element that serves as the light source 190, and each of RGB light sources may be connected to the substrate. In the second unitary elastic structure 100B' and the third unitary elastic structure 100C', the other of the turned curve strips 150 of the second unitary elastic structure 100B' and one of the turned curve strips 150 of the third unitary elastic structure 100C' are connected. In addition, in the third unitary elastic structure 100C', one end of the other of the turned curve strips 150 is optically connected to a light receiving element 195. In this manner, at least one pair of a light emitting element and a light receiving element faces the side faces of the flexible optical waveguide substrate 100 according to the present disclosure, and such pairs of a light emitting element and a light receiving element are optically connected to each other by the unitary elastic structures. In other words, the flexible optical waveguide substrate 100 is provided as the substrate including the light source 190 and the light receiving element 195 optically connected to the unitary elastic structures while exhibiting high elasticity due to the first to third unitary elastic structures 100A' to 100C'. It is to be noted that optically connected referred herein means that connection is made to allow light or an optical signal to transmit.

For instance, a case is assumed in which a light emitting element (for instance, a light emitting diode) is provided as the light source 190 facing the side face of the flexible optical waveguide substrate 100 and the light receiving element 195 is provided to form a pair with the light source 190. An optical signal enters from the side of the film-like resin material, and the incident optical signal propagates via the turned curve strips 150 through the central portion 120 of each of the first unitary elastic structure 100A', the second unitary elastic structure 100B', and the third unitary elastic structure 100C', then finally reaches the light receiving element 195. In short, the incident optical signal is transmitted to the light receiving element via the unitary elastic structures, and thus the substrate 100 is capable of serving as optical interconnection that links between the light emitting element and the light receiving element using optical signals. The flexible optical waveguide substrate 100 like this exhibits elastic characteristics, and may be provided, for instance, in a three-dimensional curved surface of the case of a device, the periphery of a drive unit, or a highly stretchable part of a human body in an installation and mounting free manner.

It is to be noted that even in this embodiment, each of the central portion 120 and the turned curve strips 150 may additionally include a resin layer (a layer other than any layer included in the film-like resin material) on the front surface as a major surface, both front and back surfaces, or a side face. In this case, it is desirable that the additional resin layer have a lower refractive index than that of any layer included in the film-like resin material. This is because the effect of optical signal confinement may be achieved. It is possible to guide an optical signal by the additional resin layer having a lower refractive index, and consequently, the optical transmission efficiency of the flexible optical waveguide film may be improved. Therefore, the flexible optical waveguide substrate 100 according to an aspect of the present disclosure allows a weak electrical signal obtained, for instance, by sensing a human body to be converted to an optical signal, and light propagates along the surface with high speed and low noise. Naturally, it may be understood that the film resin material includes two layers having different refractive indices.

Figure 13A:
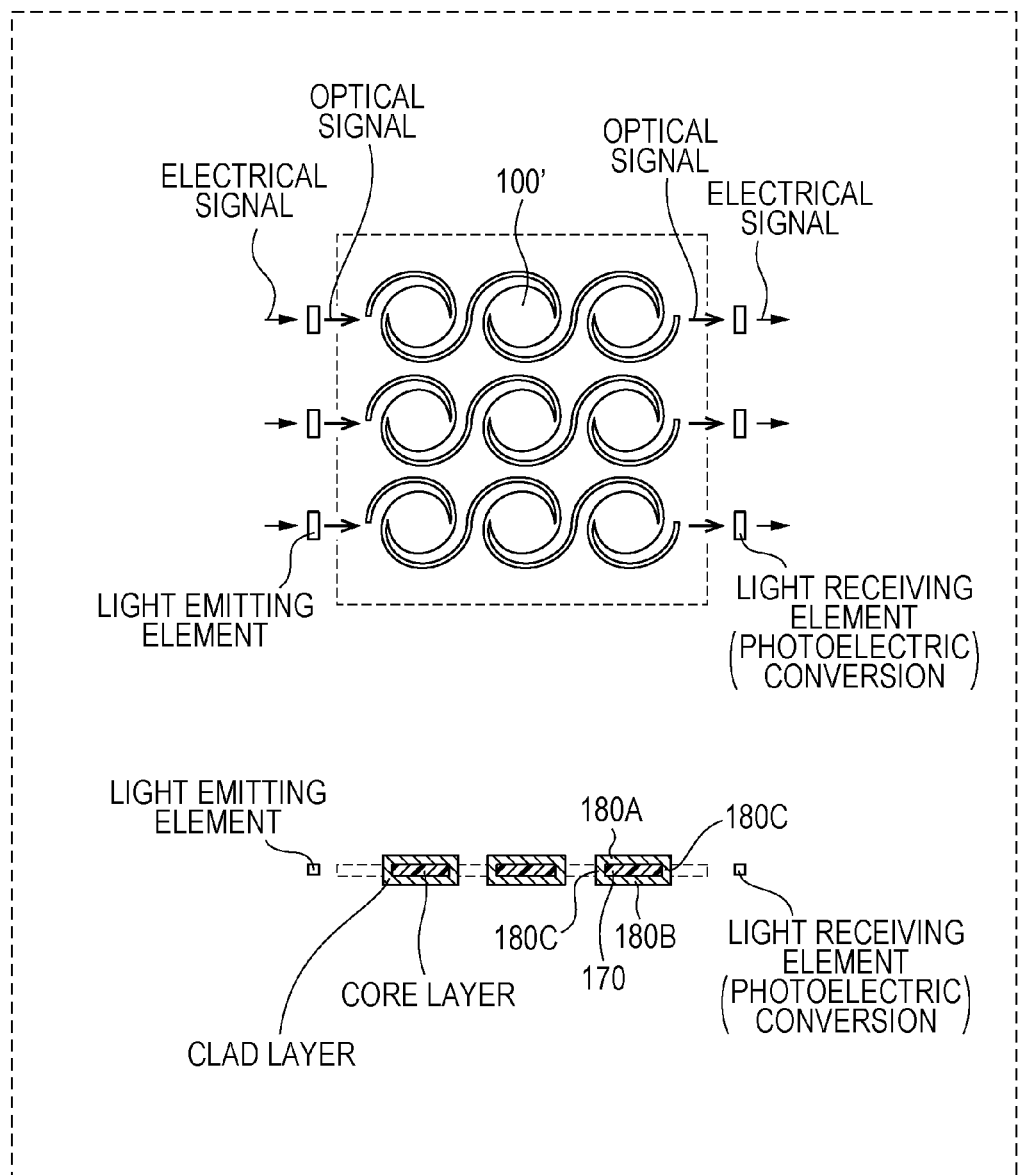
FIGS. 13A and 13B are schematic plan views schematically illustrating other desired configurations of a flexible optical waveguide substrate.
Figure 13B:
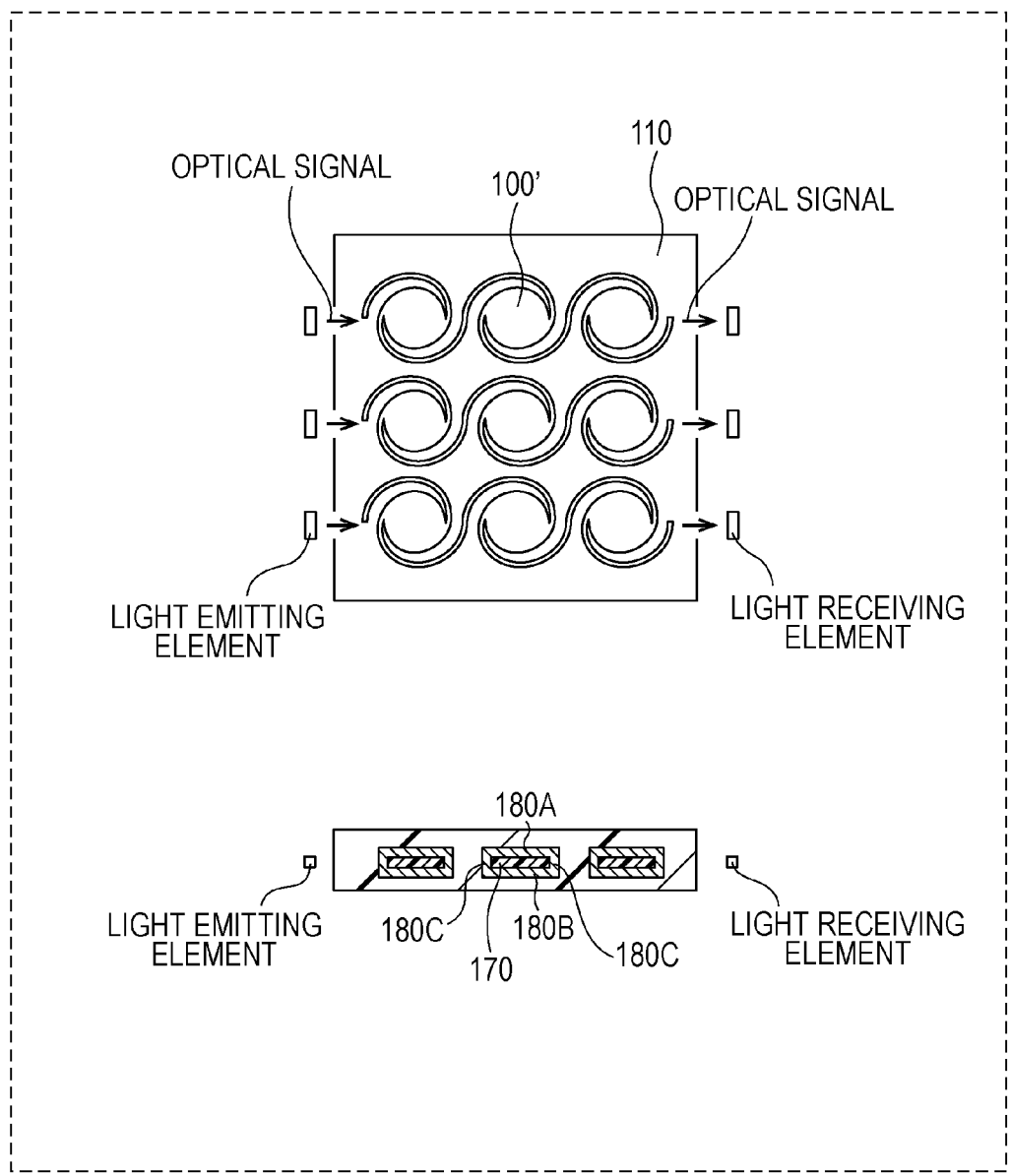

Various aspects of the flexible optical waveguide substrate 100 may be devised. For instance, the aspects as illustrated in FIGS. 13A and 13B may also be devised. Specifically, the flexible optical waveguide substrate 100 includes unitary elastic structures 100' arranged in a matrix, and allows optical signals to be entered from light emitting elements through a side face as illustrated in FIGS. 13A and 13B. Also in this aspect, optical signals propagate through the unitary elastic structures 100' (the turned curve strips 150 and the central portion 120), and thus the optical signals are received by the light receiving elements which are paired with the corresponding light emitting elements. As illustrated in FIGS. 13A and 13B, in the flexible optical waveguide substrate 100 according to an aspect of the present disclosure, core (that is, a high refractive index region)-clad (that is, a low refractive index region) has a specific form. Specifically, as illustrated in FIG. 13A, in each of the central portion and the strips, two layers 180A, 180B of low refractive index region are provided to be opposed to each other so as to interpose a layer 170 of high refractive index region, and an additional low refractive index region 180C is provided in the circumferential edge of each of the central portion and the strips so that the opposed two layers are linked to each other (see also part (d) of FIG. 9). It is to be noted that the flexible optical waveguide substrate 100 illustrated in FIG. 13B provides an aspect in which particularly a highly stretchable resin is used as the "sealing resin layer 110".

[Method of Manufacturing Flexible Optical Substrate]

Next, a method of manufacturing a flexible optical substrate will be described with reference to FIG. 14.

The flexible optical substrate according to an aspect of the present disclosure is a substrate that has unitary elastic structures each including a central portion and one or more strips, and the unitary elastic structure itself is composed of a film-like resin material. Therefore, the flexible optical substrate according to an aspect of the present disclosure may be manufactured from a resin sheet. Specifically, as illustrated in Parts (I) and (II) of FIG. 14, a unitary elastic structure composed of a film-like resin material including a central portion and one or more strips may be obtained by performing patterning treatment on a resin sheet. For instance, when the resin sheet is a photosensitive sheet, the patterning treatment may be performed by making UV exposure using a glass mask or a film mask in which a pattern has been drawn, followed by performing development processing. Alternatively, patterning treatment may be performed by cutting out a resin sheet all at once using punching machining or laser cut machining. In addition, a unitary elastic structure composed of a film-like resin material including a central portion and strips may be directly formed in print processing without using particularly a resin sheet. For instance, a resin material in a film form may be printed in a desired shape on a support base material.

Figure 14:
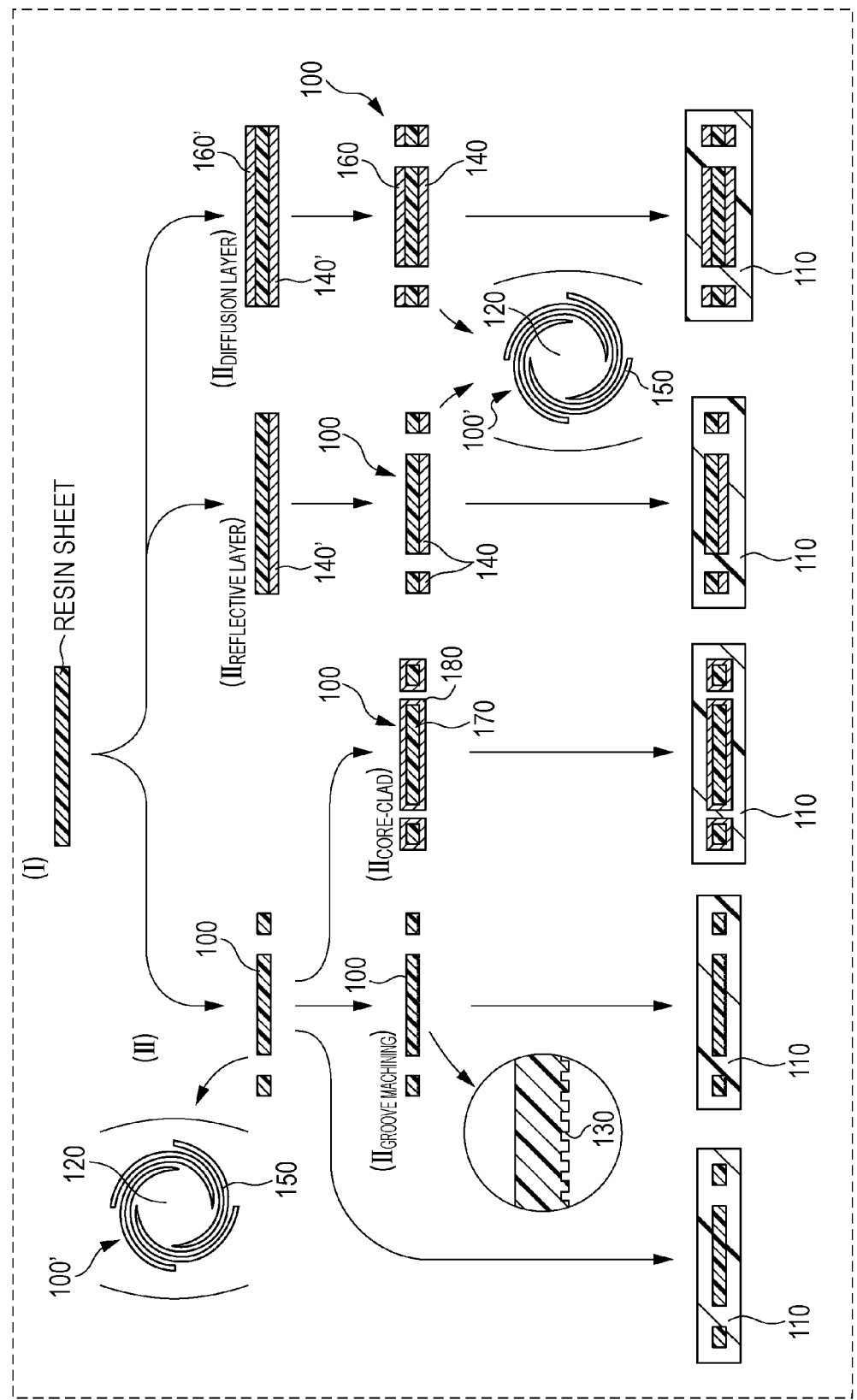
FIG. 14 is a process sectional view schematically illustrating various methods of manufacturing a flexible optical substrate.

When a flexible optical substrate is provided with a sealing resin layer, the sealing resin layer 110 is formed so that the substrate is totally sealed in as illustrated on the leftmost side of FIG. 14. For instance, the entire flexible optical substrate may be provided and covered with an elastomer material. In an aspect, in order to ensure the elasticity of the flexible optical substrate, the thickness of an elastomer material positioned at a clearance between strips is made thinner than the total thickness of a strip and an elastomer material positioned on the strip. The following is provided only as an illustration: the entire flexible optical substrate may be covered with an elastomer material by spray-coating precursor solution for an elastomer material on a unitary elastic structure composed of a film-like resin material including a central portion and one or more strips. Also, for the precursor solution of an elastomer material, the concentration of precursor solution for an elastomer material to be applied to a clearance between strips and the concentration of precursor solution for an elastomer material to be coated on the central portion and the strip may be made different.

When the flexible optical substrate is a flexible light guide substrate, a great number of fine grooves 130 may be formed in the opposite side face of the light output surface as illustrated in part ($II_{groove\ machining}$) of FIG. 14. A method of forming such a groove may be the same as the method of forming a fine groove of a conventional light guide plate. As illustrated, the sealing resin layer 110 may also be provided in a flexible light guide substrate including a great number of fine grooves 130.

When the flexible optical substrate is a flexible optical waveguide substrate, as illustrated in part ($II_{core\text{-}clad}$) of FIG. 14, an additional resin material may be provided so as to obtain the layer (for instance, core layer) 170 having a relatively high optical refractive index and the layer (for instance, clad layer) 180 having a relatively low optical refractive index positioned on the periphery of the layer 170. For instance, the film-like resin material (having a relatively high optical refractive index) is immersed in precursor solution for the additional resin material (having a relatively low optical refractive index), then curing treatment (treatment such as heat curing or photo curing) is performed, thereby making it possible to obtain the flexible optical waveguide substrate 100 including the layer (core layer) 170 having a relatively high optical refractive index and the layer (clad layer) 180 having a relatively low optical refractive index positioned on the periphery of the layer 170. It is to be noted that the flexible optical waveguide substrate 100 may also be provided with the sealing resin layer 110 as illustrated.

When the flexible optical substrate is a flexible light guide substrate and the opposite side face of the light output surface is provided with the reflective layer 140, and in addition when the light output surface is provided with the optical diffusion layer 160, as illustrated in parts ($II_{reflective\ layer}$) and ($II_{diffusion\ layer}$) of FIG. 14, a precursor layer 140' for the reflective layer and a precursor layer 160' for the optical diffusion layer may be formed before the patterning treatment of a resin sheet. In other words, after two-layer structure or three-layer structure is prepared in advance as illustrated, patterning treatment may be performed. For the formation of a precursor layer, a common technique may be utilized. For instance, when the material for a precursor layer has a sheet form, the precursor layer may be formed by performing bonding treatment using a device for vacuum lamination. Alternatively, when the material for a precursor layer has a liquid form, the precursor layer may be formed by coating and drying so that a uniform film thickness is obtained by a device such as a spin coat.

Although the flexible optical substrate according to an aspect of the present disclosure has been described in the above, the present disclosure is not limited to this and it is to be understood that various modifications may be made by those skilled in the art without departing from the scope of the present disclosure as defined in the appended claims.

Figure 15A:
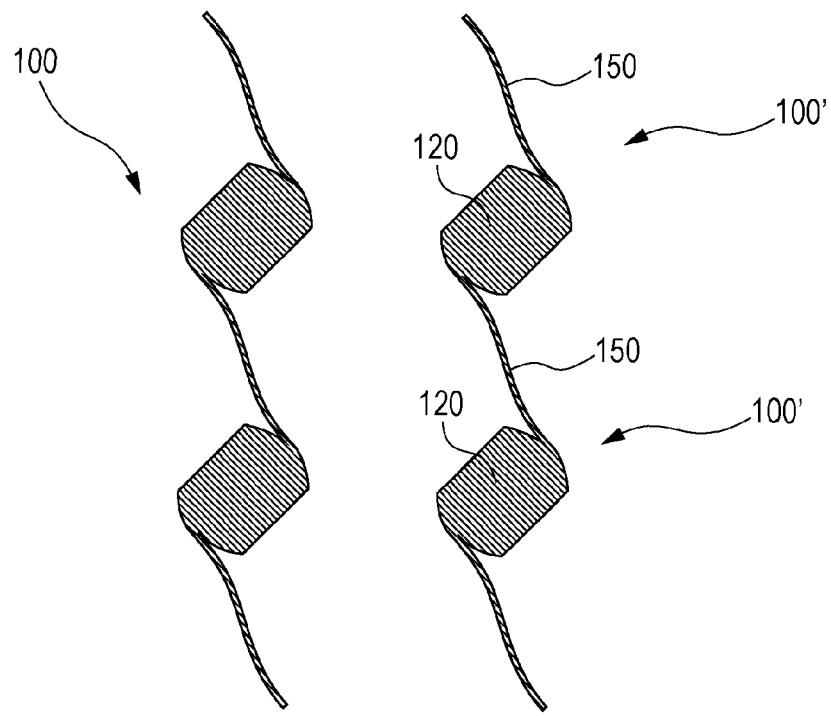
FIGS. 15A and 15B are schematic plan views illustrating a modified embodiment of the unitary elastic structures.
Figure 15B:
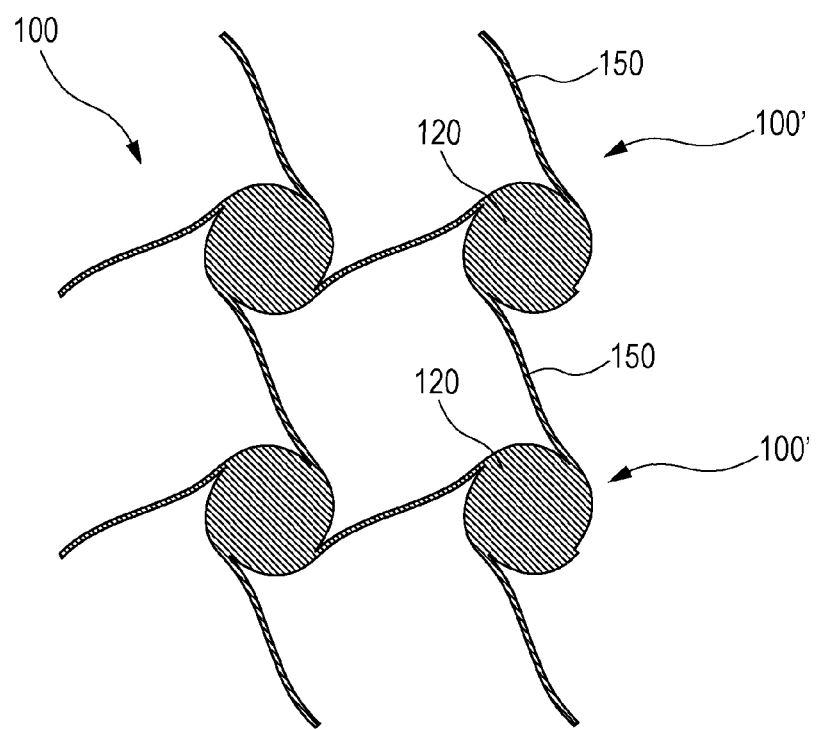

For instance, in the aspects illustrated in FIGS. 3A to 7B, the unitary elastic structures 100' arranged in a matrix are such that the clearance between adjacent unitary elastic structures is relatively small. In other words, the unitary elastic structures are arranged relatively densely. The present disclosure, however, is not necessarily limited to this. As illustrated in FIGS. 15A and 15B, the clearance between adjacent unitary elastic structures may be relatively large. In other words, the unitary elastic structures may be arranged relatively sparsely.

Figure 16:
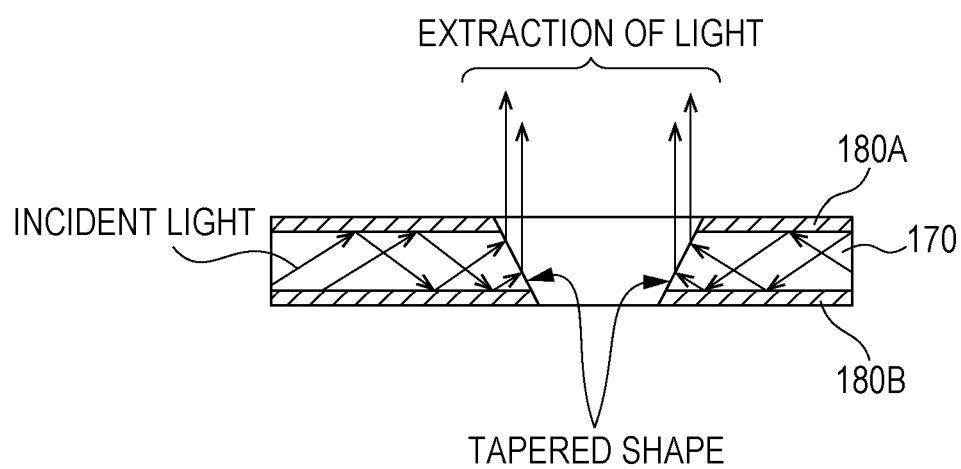
FIG. 16 is an illustration for explaining a configuration to extract light utilizing a tapered shape.

In the present disclosure, for extraction of light, the flexible light guide substrate may have a structure as illustrated in FIG. 16. That is, the side face of the central portion and/or the strips included in the unitary elastic structure may have a tapered shape, and desirable extraction of light according to the tapered shape may be performed. More specifically, FIG. 16 illustrates a section of the flexible light guide substrate in which two layers 180A, 180B of low refractive index region are provided to be opposed to each other so as to sandwich the layer 170 of high refractive index region therebetween. As illustrated, the presence of an air gap in a tapered shape in such a layered structure allows light to be extracted efficiently in a predetermined direction.

In addition, the unitary elastic structure 100' may be provided with a conductive layer which may be used also as a reflective layer or an electrical wiring layer. Although material for a conductive layer is not particularly restricted, the material may be silver (Ag), and additionally, the material may be copper (Cu), nickel (Ni), and/or chromium (Cr). Also, the material may be a conductive oxide material such as zinc oxide (ZnO), tin oxide ($SnO_2$), indium tin oxide (ITO), fluoride tin oxide (FTO), ruthenium oxide ($RuO_2$), iridium oxide ($IrO_2$), platinum oxide ($PtO_2$). In addition, the material may be a conductive polymer material such as polythiophene-based polymer and/or polyaniline-based polymer. When a conductive layer is provided, it is desirable that coating treatment or sealing treatment be performed by an insulating material, and thus a sealing resin layer is desirably provided.

The flexible optical substrate according to an aspect of the present disclosure may be utilized in the field of electronic devices including wearable devices, and in addition, the flexible optical substrate may be utilized in the healthcare field, the medical field, and the nursing-care field.

In particular, the flexible optical substrate according to an aspect of the present disclosure may be used as a light guide plate that causes a point light source to serves as a planar light emitting body. In this case, the flexible optical substrate may be used for the back light of a display device such as a liquid crystal display, lighting, advertising display boards, electric spectacular signboards, electric spectacular bulletin boards, illumination (in particular, the light guide plate according to an aspect of the present disclosure exhibits flexibility and elasticity, and thus may be used for display, lighting, signboards in a form of highly designed curved surface such as an arc surface or a wavy surface). Furthermore, the flexible optical substrate according to an aspect of the present disclosure may also be used as an optical waveguide that performs optical communication by confining an optical signal within a resin core. Similarly, the optical waveguide according to an aspect of the present disclosure exhibits flexibility and elasticity, and thus may be used for various applications.

What is claimed is:

1. A flexible optical substrate that allows incident light or optical signals to be propagated or transmitted therethrough, the flexible optical substrate comprising unitary structures,
    wherein each of the unitary structures includes a film-like resin material that has a central portion and one or more strips provided outwardly of the central portion,
    one end of each of the one or more strips is connected to the central portion,
    the unitary structures are elastic unitary structures having elasticity,
    each of the one or more strips has a form which is curved to make turns around the central portion,
    each of the unitary structures has a clearance between at least one of the one or more strips and the central portion, and/or between two adjacent strips of the one or more strips, and
    two adjacent unitary structures are linked by at least part of the strips of the two adjacent unitary structures.

2. The flexible optical substrate according to claim 1, wherein the at least part of the strips, which connects the two unitary elastic structures, has a form which is curved to have an inflection point.

3. The flexible optical substrate according to claim 1, wherein the flexible optical substrate has elasticity due to changes of curvatures of the one or more strips.

4. The flexible optical substrate according to claim 1, wherein the unitary elastic structures are arranged in one direction or arranged in one direction and in other direction crossing the one direction.

5. The flexible optical substrate according to claim 1, further comprising:
    a sealing resin layer in which the unitary elastic structures are totally sealed, wherein the sealing resin layer has higher stretchability than the film-like resin material.

6. The flexible optical substrate according to claim 1, wherein the flexible optical substrate is a flexible light guide substrate or a flexible optical waveguide substrate.

7. The flexible optical substrate according to claim 6, wherein each of the central portion and/or the one or more strips includes a first region including a resin having a first optical refractive index and a second region including a resin having a second optical refractive index lower than the first optical refractive index.

8. The flexible optical substrate according to claim 6, wherein the flexible optical substrate is the flexible light guide substrate,
each of the central portion and/or the one or more strips has a first surface from which the propagated or transmitted light is emitted and a second surface that is provided on an opposite side of the first surface, and
the flexible optical substrate further includes a reflective layer that is provided on the second surface of the central portion and/or the one or more strips, and that is a resin layer having a refractive index lower than a refractive index of the film-like resin material.

9. The flexible optical substrate according to claim 6, wherein the flexible optical substrate is the flexible light guide substrate,
each of the central portion and/or the one or more strips has a first surface from which the propagated or transmitted light is emitted, and
the flexible optical substrate further includes an optical diffusion layer that is provided on the first surface of the central portion and/or the one or more strips.

10. The flexible optical substrate according to claim 6, wherein the flexible optical substrate is the flexible light guide substrate, and
further includes at least one light emitting element that faces a side face of the unitary elastic structures.

11. The flexible optical substrate according to claim 7, wherein the flexible optical substrate is the flexible optical waveguide substrate,
in each of the central portion and/or the one or more strips, the first region is a layered region, and
the second region includes two layers that sandwich the first region therebetween, and a region that is provided on a circumferential edge of the central portion and/or the strips and that links the two layers together.

12. The flexible optical substrate according to claim 6, wherein the flexible optical substrate is the flexible optical waveguide substrate, and
includes at least one pair of a light emitting element and a light receiving element, optically connected to each other by at least part of the unitary structures.

13. The flexible optical substrate according to claim 12, wherein the light emitting element faces a first side face of the unitary structures, and the light receiving element faces a second side face different from the first side face.

14. A flexible optical substrate that allows incident light or optical signals to be propagated or transmitted therethrough, the flexible optical substrate comprising unitary structures and a sealing resin layer in which the unitary structures are totally sealed,
wherein each of the unitary structures includes a film-like resin material that has a central portion and one or more strips provided outwardly of the central portion,
one end of each of the one or more strips is connected to the central portion,
the unitary structures are elastic unitary structures having elasticity,
the sealing resin layer has higher stretchability than the film-like resin material,
each of the unitary structures has a clearance between at least one of the one or more strips and the central portion, and/or between two adjacent strips of the one or more strips, and
two adjacent unitary structures are linked by at least part of the strips of the two adjacent unitary structures.

15. A flexible optical substrate that allows incident light or optical signals to be propagated or transmitted therethrough, the flexible optical substrate comprising unitary structures,
wherein each of the unitary structures includes a film-like resin material that has a central portion and one or more strips provided outwardly of the central portion,
one end of each of the one or more strips is connected to the central portion,
the flexible optical substrate is a flexible light guide substrate or a flexible optical waveguide substrate,
each of the central portion and/or the one or more strips includes a first region including a resin having a first optical refractive index and a second region including a resin having a second optical refractive index lower than the first optical refractive index,
each of the unitary structures has a clearance between at least one of the one or more strips and the central portion, and/or between two adjacent strips of the one or more strips, and
two adjacent unitary structures are linked by at least part of the strips of the two adjacent unitary structures.

16. The flexible optical substrate according to claim 15, wherein the flexible optical substrate is the flexible optical waveguide substrate,
in each of the central portion and/or the one or more strips, the first region is a layered region, and
the second region includes two layers that sandwich the first region therebetween, and a region that is provided on a circumferential edge of the central portion and/or the strips and that links the two layers together.

* * * * *